US012407121B2

(12) United States Patent
Oh et al.

(10) Patent No.: US 12,407,121 B2
(45) Date of Patent: Sep. 2, 2025

(54) BOARD CONNECTOR

(71) Applicant: LS MTRON LTD., Anyang-si (KR)

(72) Inventors: Sang Jun Oh, Anyang-si (KR); Dong Wan Kim, Anyang-si (KR); Hyun Joo Hwang, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 259 days.

(21) Appl. No.: 17/912,585

(22) PCT Filed: Mar. 8, 2021

(86) PCT No.: PCT/KR2021/002843
§ 371 (c)(1),
(2) Date: Sep. 19, 2022

(87) PCT Pub. No.: WO2021/187789
PCT Pub. Date: Sep. 23, 2021

(65) Prior Publication Data

US 2023/0144353 A1 May 11, 2023

(30) Foreign Application Priority Data

Mar. 19, 2020 (KR) ........................ 10-2020-0033572
Mar. 5, 2021 (KR) ........................ 10-2021-0029518

(51) Int. Cl.
*H01R 12/71* (2011.01)
*H01R 13/405* (2006.01)
(Continued)

(52) U.S. Cl.
CPC ......... *H01R 12/716* (2013.01); *H01R 13/405* (2013.01); *H01R 13/6585* (2013.01); *H01R 13/6598* (2013.01)

(58) Field of Classification Search
CPC ................ H01R 12/716; H01R 13/405; H01R 13/6585; H01R 13/6598
(Continued)

(56) References Cited

U.S. PATENT DOCUMENTS 9,484,648 B2 * 11/2016 Takenaga ............. H01R 12/716
10,446,985 B2 * 10/2019 Ooi .................... H01R 13/6471
(Continued)

FOREIGN PATENT DOCUMENTS

CN 105098446 A 11/2015
CN 106410460 A 2/2017
(Continued)

OTHER PUBLICATIONS

International Search Report for related International Application No. PCT/KR2021/002843; report dated Sep. 23, 2021; (5 pages).
(Continued)

*Primary Examiner* — Peter G Leigh
(74) *Attorney, Agent, or Firm* — K&L Gates LLP

(57) ABSTRACT

The present disclosure relates to a board connector comprising a plurality of RF contacts; an insulation unit; a plurality of transmit contacts and a plurality of second RF contacts, so that the first and second RF contacts are spaced apart along a first axial direction; a ground housing; a first ground contact coupled to the insulation unit, and providing shielding between the first RF contacts and the transmit contacts, with respect to the first axial direction; and a second ground contact coupled to the insulation unit, and providing shielding between the second RF contacts and the transmit contacts, with respect to the first axial direction, wherein the first ground contact provides shielding between the first RF contacts and the transmit contacts, with respect to the first axial direction, and provides shielding between
(Continued)

the first RF contacts with respect to a second axial direction perpendicular to the first axial direction.

20 Claims, 21 Drawing Sheets

(51) Int. Cl.
*H01R 13/6585* (2011.01)
*H01R 13/6598* (2011.01)

(58) Field of Classification Search
USPC ........................................................... 439/74
See application file for complete search history.

(56) References Cited

U.S. PATENT DOCUMENTS

| | | | | |
|---|---|---|---|---|
| 10,615,545 | B2* | 4/2020 | Jin | H01R 13/6583 |
| 10,847,917 | B2* | 11/2020 | Ishida | H01R 12/716 |
| 11,075,475 | B2* | 7/2021 | Chen | H01R 13/6585 |
| 11,095,059 | B2* | 8/2021 | Gondo | H01R 24/00 |
| 11,146,004 | B2* | 10/2021 | Yamaguchi | H01R 12/714 |
| 11,152,727 | B2* | 10/2021 | Kobayashi | H01R 12/716 |
| 11,411,333 | B2* | 8/2022 | Someya | H01R 13/5219 |
| 11,424,565 | B2* | 8/2022 | Someya | H01R 12/716 |
| 11,495,903 | B2* | 11/2022 | Oosaka | H01R 12/52 |
| 11,563,284 | B2* | 1/2023 | Oosaka | H01R 13/6271 |
| 11,605,911 | B2* | 3/2023 | Yamada | H01R 12/7005 |
| 11,837,811 | B2* | 12/2023 | Sugaya | H01R 13/405 |
| 11,888,268 | B2* | 1/2024 | Mamuro | H01R 12/73 |
| 2008/0045076 | A1* | 2/2008 | Dittmann | H01R 12/88 439/495 |
| 2013/0005192 | A1* | 1/2013 | Lim | H01R 12/716 439/660 |
| 2013/0012039 | A1* | 1/2013 | Nose | H01R 12/73 439/74 |
| 2013/0059471 | A1* | 3/2013 | Mongold | H05K 1/0218 439/607.14 |
| 2015/0140840 | A1* | 5/2015 | Nishimura | H01R 12/775 439/74 |
| 2015/0140841 | A1* | 5/2015 | Watanabe | H01R 12/7011 439/74 |
| 2015/0303601 | A1 | 10/2015 | Jeon et al. | |
| 2016/0093967 | A1* | 3/2016 | Takenaga | H01R 12/716 439/660 |
| 2016/0240944 | A1* | 8/2016 | Kodaira | H01R 12/707 |
| 2017/0005423 | A1* | 1/2017 | Takenaga | H01R 13/635 |
| 2017/0070008 | A1* | 3/2017 | Soga | H01R 13/6471 |
| 2018/0183189 | A1* | 6/2018 | Chuang | H01R 13/6585 |
| 2018/0198241 | A1* | 7/2018 | Ooi | H01R 13/6597 |
| 2019/0214772 | A1* | 7/2019 | Kodama | H01R 13/6582 |
| 2020/0044374 | A1* | 2/2020 | Ishida | H01R 12/721 |
| 2020/0144754 | A1* | 5/2020 | Ishida | H01R 13/426 |
| 2021/0359471 | A1* | 11/2021 | Oosaka | H01R 12/73 |
| 2022/0094112 | A1* | 3/2022 | Kim | H01R 13/6471 |
| 2023/0104947 | A1* | 4/2023 | Oh | H01R 13/6591 439/74 |
| 2023/0144353 | A1* | 5/2023 | Oh | H01R 13/6582 439/74 |

FOREIGN PATENT DOCUMENTS

| | | | | | |
|---|---|---|---|---|---|
| JP | 2016152084 | A | * | 8/2016 | H01R 12/707 |
| JP | 2017050235 | A | * | 3/2017 | H01R 13/4223 |
| JP | 2017208165 | A | * | 11/2017 | H01R 12/71 |
| JP | 2018110087 | A | | 7/2018 | |
| JP | 6493611 | B1 | * | 4/2019 | H01R 12/716 |
| JP | 6513509 | B2 | * | 5/2019 | H01R 12/716 |
| JP | 6537890 | B2 | * | 7/2019 | H01R 12/716 |
| JP | 2019530164 | A | | 10/2019 | |
| JP | 2019197719 | A | | 11/2019 | |
| JP | 6628685 | B2 | * | 1/2020 | H01R 12/71 |
| JP | 2020077490 | A | * | 5/2020 | H01R 12/716 |
| JP | 2021111598 | A | | 8/2021 | |
| KR | 20170015125 | A | | 2/2017 | |
| KR | 20170036529 | A | | 4/2017 | |
| KR | 20170129066 | A | | 11/2017 | |
| KR | 20180006795 | A | | 1/2018 | |
| KR | 20180081441 | A | | 7/2018 | |
| KR | 20180119056 | A | | 11/2018 | |
| KR | 20190000510 | A | | 1/2019 | |
| KR | 20200008840 | A | | 1/2020 | |
| WO | 2017196100 | A2 | | 11/2017 | |
| WO | 2018025873 | A1 | | 2/2018 | |
| WO | WO-2018049686 | A1 | * | 3/2018 | H01R 12/716 |
| WO | 2020040004 | A1 | | 2/2020 | |

OTHER PUBLICATIONS

Written Opinion for related International Application No. PCT/KR2021/002843; report dated Sep. 23, 2021; (5 pages).
Notice of Allowance for related Japanese Application No. 2022-556056; action dated Jan. 5, 2024; (3 pages).
Office Action for related Korean Patent Application No. 10-2021-0029518; action dated Jan. 24, 2024; (7 pages).
Office Action for related Japanese Patent Application No. 2022-537233; action dated Dec. 8, 2023; (3 pages).
Office Action for related Japanese Application No. 2022-556056; action dated Sep. 29, 2023; (3 pages).
Office Action for related Chinese Application No. 202180019315.9; action dated May 30, 2025; (9 pages).
Notice of Allowance for related Chinese Application No. 202180008267.3; action dated Jun. 2, 2025; (7 pages).

* cited by examiner

BOARD CONNECTOR

CROSS-REFERENCE TO RELATED APPLICATION

The present application is a National Stage of International Application No. PCT/KR2021/002843 filed on Mar. 8, 2021, which claims priority to and the benefit of Korean Utility Model Application No. 10-2020-0033572, filed on Mar. 19, 2020; and Korean Utility Model Application No. 10-2021-0029518, filed Mar. 5, 2021 the disclosures of which are incorporated herein by reference in their entirety.

FIELD

The present disclosure relates to a board connector installed in an electronic device for electrical connection between boards.

BACKGROUND

Connectors are provided in various electronic devices for electrical connection. For example, the connectors may be installed in electronic devices such as mobile phones, computers, tablet computers, and the like to electrically connect various components installed in the electronic devices to each other.

In general, radio frequency (RF) connectors and board-to-board connectors (hereinafter, referred to as "board connectors") are provided inside wireless communication devices such as smartphones, tablet personnel computers (PCs), or the like among the electronic devices. The RF connectors transmit RF signals. The board connectors process digital signals of cameras or the like.

Such an RF connector and board connector are mounted on a printed circuit board (PCB). Conventionally, there is a problem that a mounting area of a PCB increases since a plurality of board connectors and RF connectors are mounted in a limited PCB space together with a plurality of components. Accordingly, with a recent trend of miniaturization of smartphones, there is a need for a technique in which the RF connector and the board connector are integrated and optimized for a small mounting area on the PCB.

FIG. 1 is a schematic perspective view of a board connector according to the related art.

Referring to FIG. 1, a board connector 100 according to the related art includes a first connector 110 and a second connector 120.

The first connector 110 is provided to be coupled to a first board (not shown). The first connector 110 may be electrically connected to the second connector 120 through a plurality of first contacts 111.

The second connector 120 is provided to be coupled to a second board (not shown). The second connector 120 may be electrically connected to the first connector 110 through a plurality of second contacts 121.

In the board connector 100 according to the related art, as the first contacts 111 and the second contacts 121 are connected to each other, the first board and the second board may be electrically connected to each other. In addition, when some contacts among the first contacts 111 and the second contacts 121 are used as RF contacts for transmitting RF signals, the board connector 100 according to the related art may be realized such that the RF signals are transmitted between the first board and the second board through the RF contacts.

Here, the board connector 100 according to the related art has the following problems.

First, in the board connector 100 according to the related art, when contacts, which are spaced apart by a relatively small distance, among the contacts 111 and 121 are used as the RF contacts, there is a problem in that signal transmission is not smoothly performed due to RF signal interference between RF contacts 111' and 111" and between RF contacts 121' and 121".

Second, the board connector 100 according to the related art has an RF signal shielding unit 112 at an outermost portion thereof, and thus there is a problem in that radiation of the RF signal to the outside can be shielded but shielding between the RF signals is not performed.

Third, in the board connector 100 according to the related art, the RF contacts 111', 111", 121', and 121" respectively include mounting units **111*a*', 111*a*", 121*a*', and 121*a*" mounted on the board, and the mounting units 111*a*', 111*a*", 121*a*', and 121*a*" are disposed to be exposed to the outside. Accordingly, there is a problem in that shielding for the mounting units 111*a*', 111*a*", 121*a*', and 121*a*" is not performed in the board connector 100** according to the related art.

SUMMARY

Therefore, the present disclosure is designed to solve the problems and is for providing a board connector capable of reducing the possibility of occurring radio frequency (RF) signal interference between RF contacts.

To solve the above problems, the present disclosure may include the following configurations.

A board connector according to the present disclosure may include a plurality of radio frequency (RF) contacts for transmitting an RF signal, an insulation unit configured to support the RF contacts, a plurality of transmit contacts that are coupled to the insulation unit between a plurality of first RF contacts among the RF contacts and a plurality of second RF contacts among the RF contacts such that the first RF contacts and the second RF contacts are spaced apart from each other along a first axial direction, a ground housing to which the insulation unit is coupled, a first ground contact coupled to the insulation unit and configured to shield between the first RF contacts and the transmit contacts with respect to the first axial direction, and a second ground contact coupled to the insulation unit and configured to shield between the second RF contacts and the transmit contacts with respect to the first axial direction. The first ground contact may shield between the first RF contacts and the transmit contacts with respect to the first axial direction, and shield between the first RF contacts with respect to a second axial direction perpendicular to the first axial direction.

A board connector according to the present disclosure may include a plurality of radio frequency (RF) contacts for transmitting an RF signal, an insulation unit configured to support the RF contacts, a plurality of transmit contacts that are coupled to the insulation unit between a plurality of first RF contacts among the RF contacts and a plurality of second RF contacts among the RF contacts such that the first RF contacts and the second RF contacts are spaced apart from each other along a first axial direction, a ground housing to which the insulation unit is coupled, a first ground contact coupled to the insulation unit and configured to shield between the first RF contacts and the transmit contacts with respect to the first axial direction, and a second ground contact coupled to the insulation unit and configured to shield between the second RF contacts and the transmit contacts with respect to the first axial direction.

According to the present disclosure, the following effects can be obtained.

The present disclosure can realize a shielding function against signals, electromagnetic waves, or the like for radio frequency (RF) contacts using a ground housing and a ground contact. Thus, the present disclosure can prevent electromagnetic waves, which are generated from the RF contacts, from interfering with signals of circuit components located around an electronic device, and prevent electromagnetic waves, which are generated from the circuit components located around the electronic device, from interfering with RF signals transmitted by the RF contacts. Accordingly, the present disclosure can contribute to improving electromagnetic interference (EMI) shielding performance and electromagnetic compatibility (EMC) performance using the ground housing and the ground contact.

In the present disclosure, it can be realized such that all RF contacts, including portions mounted on a board, are located inside a ground housing. Accordingly, the present disclosure can realize complete shielding by enhancing a shielding function for the RF contacts using the ground housing.

DETAILED DESCRIPTION

Figure 8:
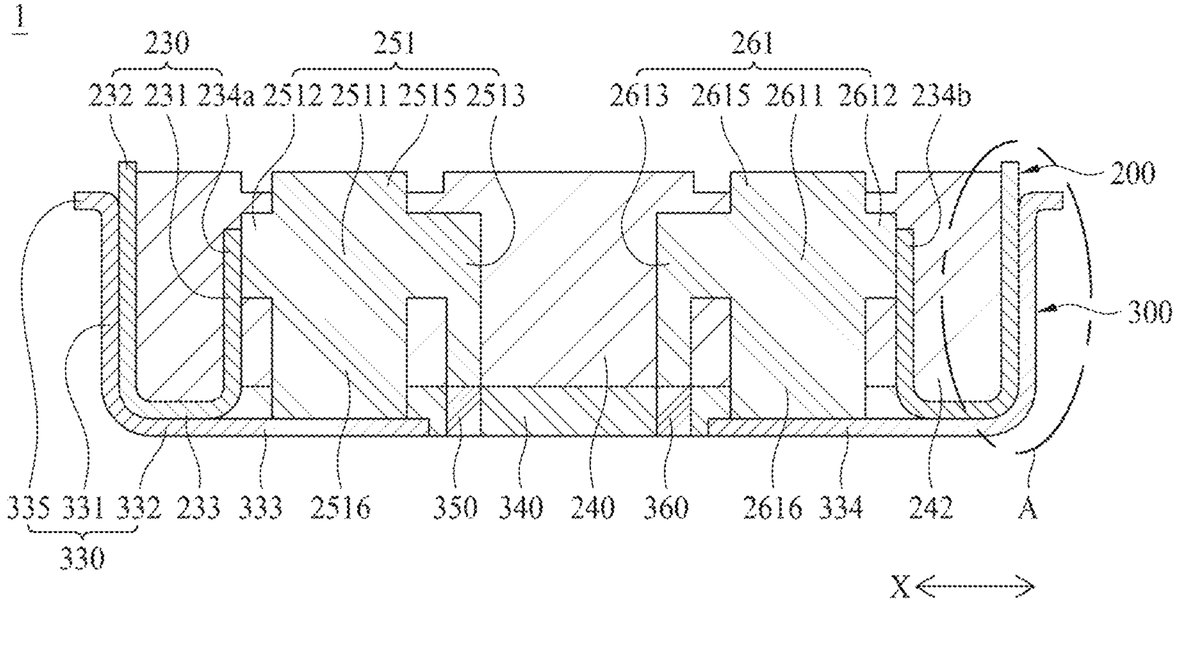
FIG. 8 is a schematic cross-sectional side view taken along line I-I of FIG. 7, illustrating a state in which the board connector according to the first embodiment is coupled to a board connector according to a second embodiment.
Figure 9:
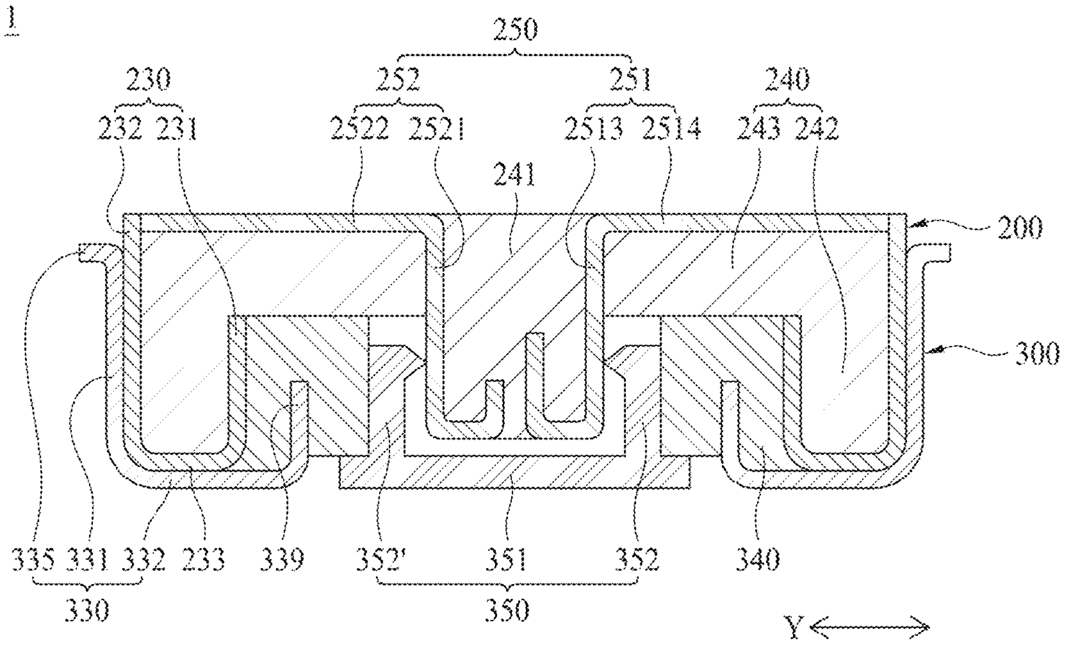
FIG. 9 is a schematic cross-sectional side view taken along line II-II of FIG. 7, illustrating the state in which the board connector according to the first embodiment is coupled to the board connector according to the second embodiment.

Hereinafter, embodiments of a board connector according to the present disclosure will be described in detail with reference to the accompanying drawings. FIGS. 8 and 9 illustrate a state in which a connector according to a first embodiment is reversed in a direction shown in FIGS. 2 and 3 and coupled to a connector according to a second embodiment.

Figure 1:
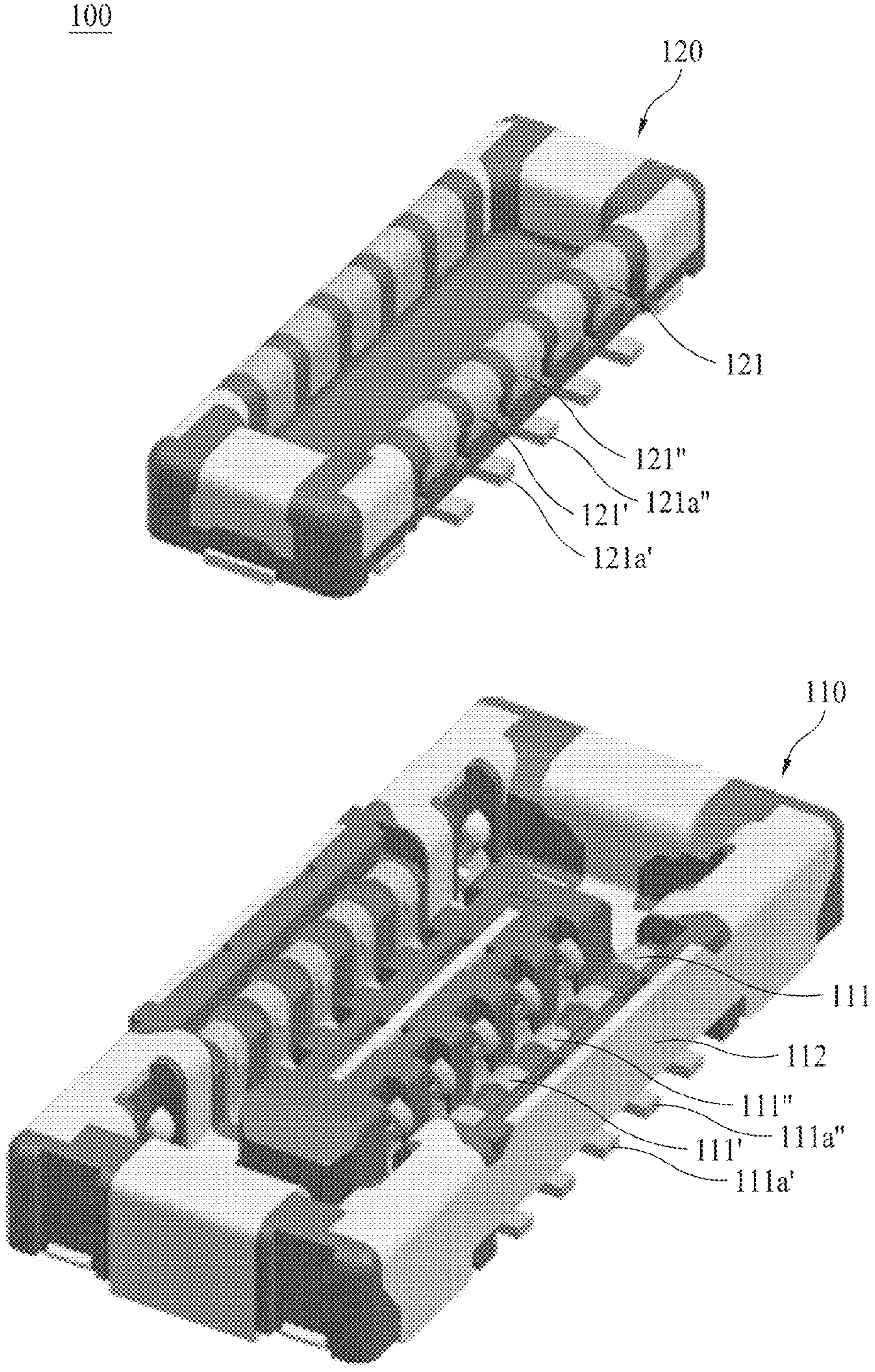
FIG. 1 is a schematic perspective view of a board connector according to the related art.
Figure 2:
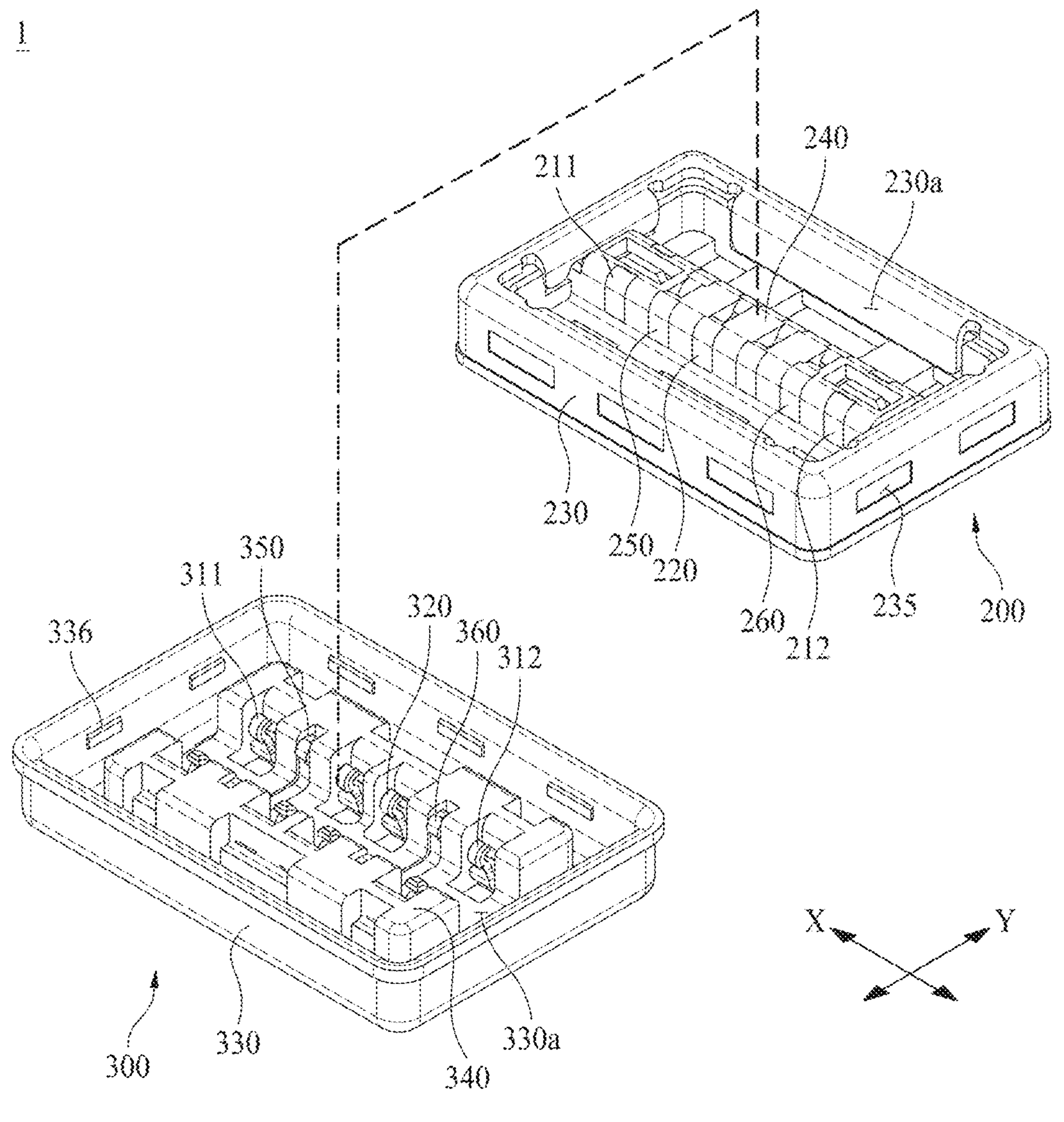
FIG. 2 is a schematic perspective view of a receptacle connector and a plug connector in a board connector according to the present disclosure.

Referring to FIG. 2, a board connector 1 according to the present disclosure may be installed in an electronic device (not shown) such as a mobile phone, a computer, a tablet computer, or the like. The board connector 1 according to the present disclosure may be used to electrically connect a plurality of boards (not shown). The boards may be printed circuit boards (PCBs). For example, when a first board and a second board are electrically connected, a receptacle connector mounted on the first board and a plug connector mounted on the second board may be connected to each other. Accordingly, the first board and the second board may be electrically connected to each other through the receptacle connector and the plug connector. A plug connector mounted on the first board and a receptacle connector mounted on the second board may also be connected to each other.

The board connector 1 according to the present disclosure may be realized as the receptacle connector. The board connector 1 according to the present disclosure may be realized as the plug connector. The board connector 1 according to the present disclosure may also be realized by including both the receptacle connector and the plug connector. Hereinafter, the board connector according to an embodiment in which the board connector 1 according to the present disclosure is realized as the plug connector is defined as a board connector 200 according to the first embodiment, and the board connector according to an embodiment in which the board connector 1 according to the present disclosure is realized as the receptacle connector is defined as a board connector 300 according to the second embodiment, and these will be described in detail with reference to the accompanying drawings. In addition, descriptions will be made on the basis of an embodiment in which the board connector 200 according to the first embodiment is mounted on the first board and the board connector 300 according to the second embodiment is mounted on the second board. It should be apparent to those skilled in the art to which the present disclosure belongs to derive an embodiment, in which the board connector 1 according to the present disclosure includes both the receptacle connector and the plug connector, therefrom.

<Board Connector 200 According to First Embodiment>

Figure 3:
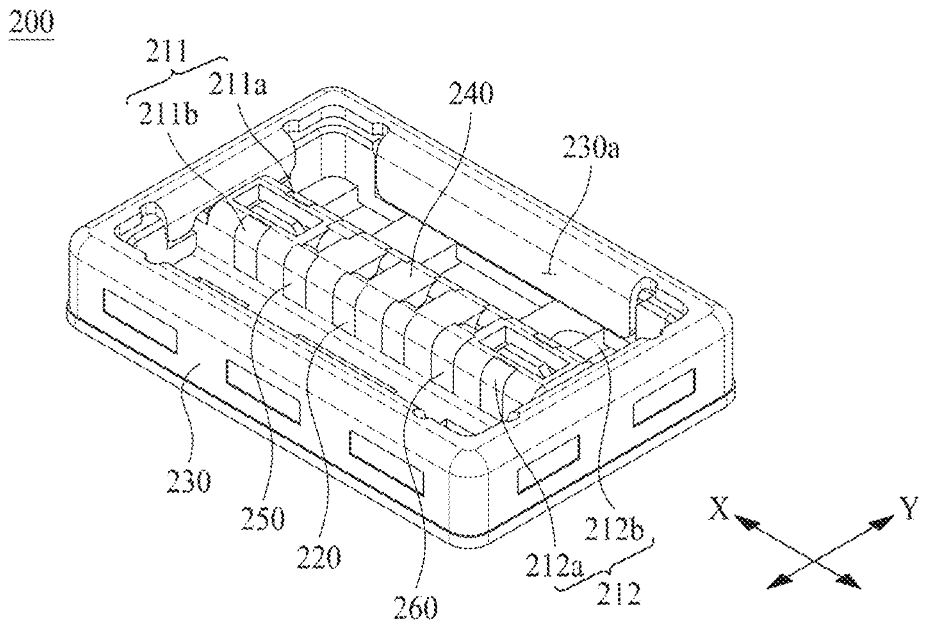
FIG. 3 is a schematic perspective view of a board connector according to a first embodiment.
Figure 4:
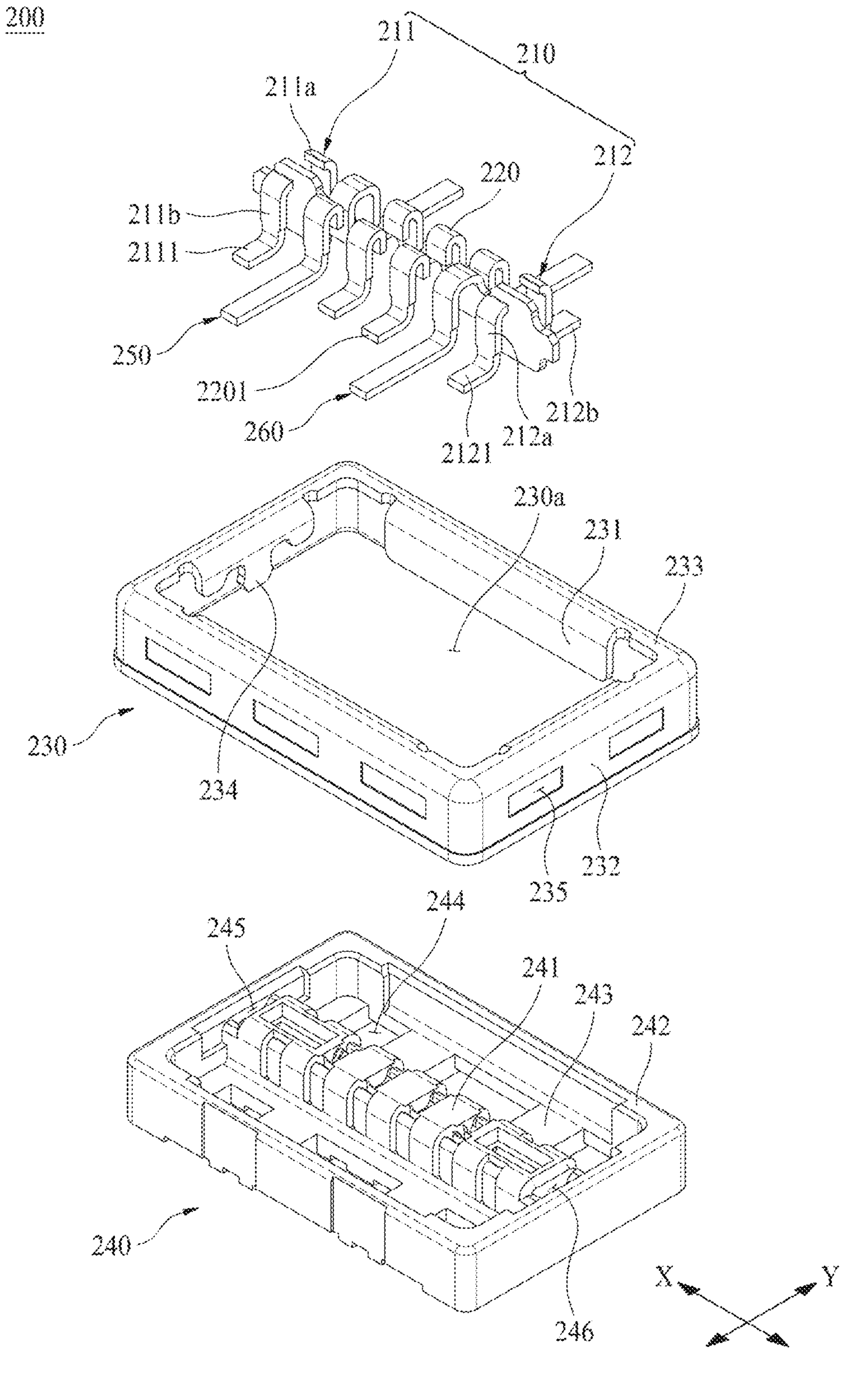
FIG. 4 is a schematic exploded perspective view of the board connector according to the first embodiment.

Referring to FIGS. 2 to 4, the board connector 200 according to the first embodiment may include a plurality of radio frequency (RF) contacts 210, a plurality of transmit contacts 220, a ground housing 230, and an insulation unit 240.

The RF contacts 210 are for transmitting RF signals. The RF contacts 210 may transmit ultra-high frequency RF signals. The RF contacts 210 may be supported by the insulation unit 240. The RF contacts 210 may be coupled to the insulation unit 240 through an assembly process. The RF contacts 210 may also be integrally molded with the insulation unit 240 through injection molding.

The RF contacts 210 may be disposed to be spaced apart from each other. The RF contacts 210 may be electrically connected to the first board by being mounted on the first board. The RF contacts 210 may be electrically connected to the second board, on which a mating connector is mounted, by being connected to RF contacts included in the mating connector. Accordingly, the first board and the second board may be electrically connected. When the board connector 200 according to the first embodiment is a plug connector, the mating connector may be a receptacle connector. When the board connector 200 according to the first embodiment is a receptacle connector, the mating connector may be a plug connector.

A first RF contact 211 among the RF contacts 210 and a second RF contact 212 among the RF contacts 210 may be spaced apart from each other along a first axial direction (X-axis direction). The first RF contact 211 and the second RF contact 212 may be supported by the insulation unit 240 at locations spaced apart from each other along the first axial direction (X-axis direction).

The first RF contact 211 may include a first RF mounting member 2111. The first RF mounting member 2111 may be mounted on the first board. Accordingly, the first RF contact 211 may be electrically connected to the first board through the first RF mounting member 2111. The first RF contact 211 may be formed of an electrically conductive material. For example, the first RF contact 211 may be formed of metal. The first RF contact 211 may be connected to any one of the RF contacts included in the mating connector.

The second RF contact 212 may include a second RF mounting member 2121. The second RF mounting member 2121 may be mounted on the first board. Accordingly, the second RF contact 212 may be electrically connected to the first board through the second RF mounting member 2121. The second RF contact 212 may be formed of an electrically conductive material. For example, the second RF contact 212 may be formed of metal. The second RF contact 212 may be connected to any one of the RF contacts included in the mating connector.

Referring to FIGS. 2 to 4, the transmit contacts 220 are coupled to the insulation unit 240. The transmit contacts 220 may serve to transmit signals, data, and the like. The transmit contacts 220 may be coupled to the insulation unit 240 through an assembly process. The transmit contacts 220 may also be integrally molded with the insulation unit 240 through injection molding.

The transmit contacts 220 may be disposed between the first RF contact 211 and the second RF contact 212 with respect to the first axial direction (X-axis direction). Accordingly, in order to reduce RF signal interference between the first RF contact 211 and the second RF contact 212, the transmit contacts 220 may be disposed in a space in which the first RF contact 211 and the second RF contact 212 are spaced apart. Accordingly, the board connector 200 according to the first embodiment may not only reduce RF signal interference by increasing a distance by which the first RF contact 211 and the second RF contact 212 are spaced apart from each other, but also improve space utilization for the insulation unit 240 by disposing the transmit contacts 220 in a separation space for this purpose.

The transmit contacts 220 may be disposed to be spaced apart from each other. The transmit contacts 220 may be electrically connected to the first board by being mounted on the first board. In this case, a transmission mounting member 2201 included in each of the transmit contacts 220 may be mounted on the first board. The transmit contacts 220 may be formed of an electrically conductive material. For example, the transmit contacts 220 may be formed of metal. The transmit contacts 220 may be electrically connected to the second board, on which the mating connector is mounted, by being connected to transmit contacts included in the mating connector. Accordingly, the first board and the second board may be electrically connected.

Meanwhile, in FIG. 4, the board connector 200 according to the first embodiment is illustrated as including four transmit contacts 220, but the present disclosure is not limited thereto, and the board connector 200 according to the first embodiment may also include five or more transmit contacts 220. The transmit contacts 220 may be spaced apart from each other along the first axial direction (X-axis direction) and a second axial direction (Y-axis direction). The first axial direction (X-axis direction) and the second axial direction (Y-axis direction) are axis directions perpendicular to each other.

Referring to FIGS. 2 to 4, the ground housing 230 is coupled to the insulation unit 240. The ground housing 230 may be grounded by being mounted on the first board. Accordingly, the ground housing 230 may realize a shielding function against signals, electromagnetic waves, or the like for the RF contacts 210. In this case, the ground housing 230 may prevent electromagnetic waves generated from the RF contacts 210 from interfering with signals of circuit components located around the electronic device, and may prevent electromagnetic waves generated from the circuit components located around the electronic device from interfering with RF signals transmitted by the RF contacts 210. Accordingly, the board connector 200 according to the first embodiment may contribute to improving electromagnetic interference (EMI) shielding performance and electromagnetic compatibility (EMC) performance using the ground housing 230. The ground housing 230 may be formed of an electrically conductive material. For example, the ground housing 230 may be formed of metal.

The ground housing 230 may be disposed to surround sides of an inner side space 230$a$. A portion of the insulation unit 240 may be located in the inner side space 230$a$. All of the first RF contact 211, the second RF contact 212, and the transmit contacts 220 may be located in the inner side space

230*a*. In this case, all of the first RF mounting member 2111, the second RF mounting member 2121, and the transmission mounting member 2201 may also be located in the inner side space 230*a*. Accordingly, the ground housing 230 may enhance a shielding function for the first RF contact 211 and the second RF contact 212 by realizing shielding walls for all of the first RF contact 211 and the second RF contact 212, thereby realizing complete shielding. The mating connector may be inserted into the inner side space 230*a*.

The ground housing 230 may be disposed to surround all sides of the inner side space 230*a*. The inner side space 230*a* may be disposed inside the ground housing 230. When the entire ground housing 230 is formed in a rectangular loop shape, the inner side space 230*a* may be formed in a rectangular parallelepiped shape. In this case, the ground housing 230 may be disposed to surround four sides of the inner side space 230*a*.

The ground housing 230 may be integrally formed as one piece without a seam. The ground housing 230 may be integrally formed as one piece without a seam by a metal injection method, such as a metal die casting method, a metal injection molding (MIM) method, or the like. The ground housing 230 may be integrally formed as one piece without a seam by a computer numerical control (CNC) process, a machining center tool (MCT) process, or the like.

Referring to FIGS. 2 to 4, the insulation unit 240 supports the RF contacts 210. The RF contacts 210 and the transmit contacts 220 may be coupled to the insulation unit 240. The insulation unit 240 may be formed of an insulating material. The insulation unit 240 may be coupled to the ground housing 230 such that the RF contacts 210 are located in the inner side space 230*a*.

Referring to FIGS. 2 to 4, the board connector 200 according to the first embodiment may include a first ground contact 250.

The first ground contact 250 is coupled to the insulation unit 240. The first ground contact 250 may be grounded by being mounted on the first board. The first ground contact 250 may be coupled to the insulation unit 240 through an assembly process. The first ground contact 250 may also be integrally molded with the insulation unit 240 through injection molding.

The first ground contact 250 may realize a shielding function for the first RF contact 211 together with the ground housing 230. In this case, the first ground contact 250 may be disposed between the first RF contact 211 and the transmit contacts 220 with respect to the first axial direction (X-axis direction). The first ground contact 250 may be formed of an electrically conductive material. For example, the first ground contact 250 may be formed of metal. When the mating connector is inserted into the inner side space 230*a*, the first ground contact 250 may be connected to a ground contact included in the mating connector.

Referring to FIGS. 2 to 4, the board connector 200 according to the first embodiment may include a second ground contact 260.

The second ground contact 260 is coupled to the insulation unit 240. The second ground contact 260 may be grounded by being mounted on the first board. The second ground contact 260 may be coupled to the insulation unit 240 through an assembly process. The second ground contact 260 may also be integrally molded with the insulation unit 240 through injection molding.

The second ground contact 260 may realize a shielding function for the second RF contact 212 together with the ground housing 230. The second ground contact 260 may be disposed between the transmit contacts 220 and the second RF contact 212 with respect to the first axial direction (X-axis direction). The second ground contact 260 may be formed of an electrically conductive material. For example, the second ground contact 260 may be formed of metal. When the mating connector is inserted into the inner side space 230*a*, the second ground contact 260 may be connected to the ground contact included in the mating connector.

Here, the board connector 200 according to the first embodiment may be realized to include a plurality of first RF contacts 211 and a plurality of second RF contacts 212.

Referring to FIGS. 2 to 9, the first RF contacts 211 and the second RF contacts 212 may be disposed to be spaced apart from each other along the first axial direction (X-axis direction). The transmit contacts 220 may be disposed between the first RF contacts 211 and the second RF contacts 212 with respect to the first axial direction (X-axis direction). In this case, the first ground contact 250 may shield between the first RF contacts 211 and the transmit contacts 220 with respect to the first axial direction (X-axis direction). The second ground contact 260 may shield between the second RF contacts 212 and the transmit contacts 220 with respect to the first axial direction (X-axis direction).

When the plurality of first RF contacts 211 are provided, the first ground contact 250 may shield between the first RF contacts 211 and the transmit contacts 220 with respect to the first axial direction (X-axis direction), and also, shield between the first RF contacts 211 with respect to the second axial direction (Y-axis direction). Accordingly, by using the first ground contact 250, the board connector 200 according to the first embodiment may realize a shielding function for between the first RF contacts 211 and the transmit contacts 220 and also, additionally realize a shielding function for between the first RF contacts 211. Accordingly, the board connector 200 according to the first embodiment may be realized to transmit a wider variety of RF signals using the first RF contacts 211, thereby improving versatility applicable to a wider variety of electronic products.

Figure 5:
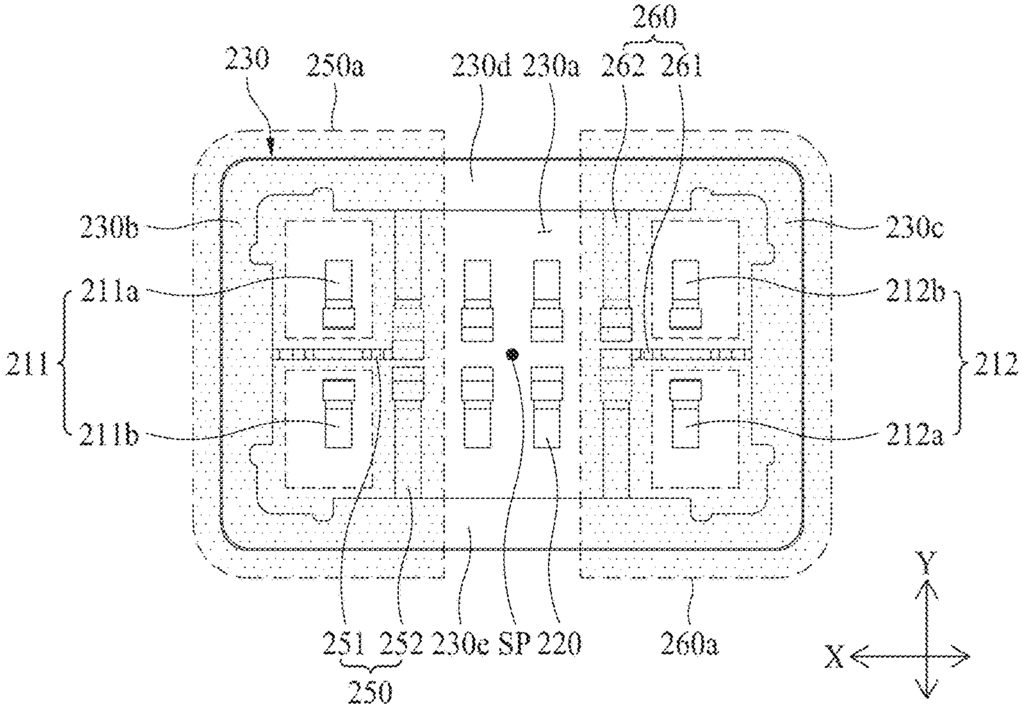
FIG. 5 is a schematic plan view for describing a ground loop in the board connector according to the first embodiment.
Figure 6:
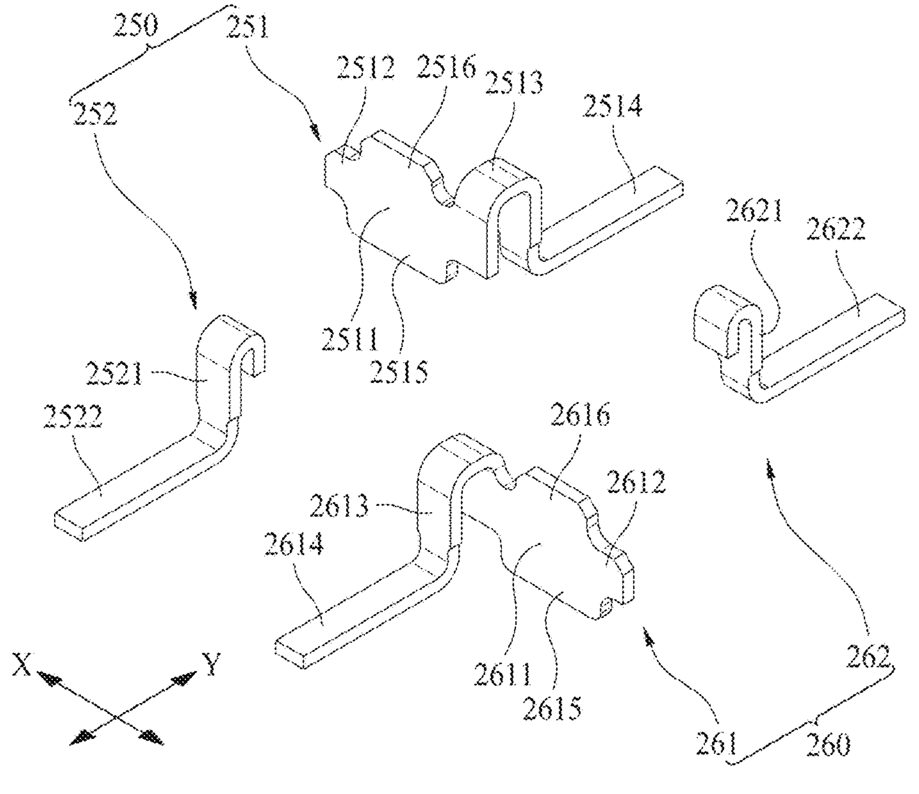
FIG. 6 is a schematic perspective view of a first ground contact and a second ground contact in the board connector according to the first embodiment.

A first-first RF contact 211*a* among the first RF contacts 211 and a first-second RF contact 211*b* among the first RF contacts 211 may be coupled to the insulation unit 240 so as to be spaced apart from each other along the second axial direction (Y-axis direction). In FIG. 5, the board connector 200 according to the first embodiment is illustrated as including two first RF contacts 211 realized as the first-first RF contact 211*a* and the first-second RF contact 211*b*, but the present disclosure is not limited thereto, and the board connector 200 according to the first embodiment may also include three or more first RF contacts 211. Meanwhile, in the present specification, descriptions will be made on the basis of the case in which the board connector 200 according to the first embodiment includes the first-first RF contact 211*a* and the first-second RF contact 211*b*.

When the first-first RF contact 211*a* and the first-second RF contact 211*b* are provided, the first ground contact 250 may include a first-first ground contact 251 and a first-second ground contact 252.

The first-first ground contact 251 may be located between the first-first RF contact 211*a* and the transmit contacts 220 with respect to the first axial direction (X-axis direction). Accordingly, the first-first ground contact 251 may shield between the first-first RF contact 211*a* and the transmit contacts 220.

The first-first ground contact 251 may include a first-first shield member 2511.

The first-first shield member 2511 may be located between the first-first RF contact 211*a* and the first-second RF contact 211*b* with respect to the second axial direction (Y-axis direction). Accordingly, the first-first ground contact 251 may shield between the first-first RF contact 211*a* and the first-second RF contact 211*b* using the first-first shield member 2511. Accordingly, even though the first-first RF contact 211*a* and the first-second RF contact 211*b* transmit different RF signals, the board connector 200 according to the first embodiment may prevent signals or the like from being interfered between the first-first RF contact 211*a* and the first-second RF contact 211*b* using the first-first shield member 2511. Accordingly, the board connector 200 according to the first embodiment may be realized to stably transmit a wider variety of RF signals using the first-first RF contact 211*a* and the first-second RF contact 211*b*. The first-first shield member 2511 may be formed in a plate shape disposed in a vertical direction between the first-first RF contact 211*a* and the first-second RF contact 211*b*.

The first-first shield member 2511 may be disposed to be spaced apart from each of the first-first RF contact 211*a* and the first-second RF contact 211*b* with respect to the second axial direction (Y-axis direction) by the same distance. Accordingly, in the board connector 200 according to the first embodiment, a deviation between shielding performance for the first-first RF contact 211*a* and shielding performance for the first-second RF contact 211*b* may be reduced. Accordingly, the board connector 200 according to the first embodiment may stably realize a shielding function for each of the first-first RF contact 211*a* and the first-second RF contact 211*b* using the first-first shield member 2511.

The first-first ground contact 251 may include a first-first shield protrusion 2512.

The first-first shield protrusion 2512 protrudes from the first-first shield member 2511. The first-first shield protrusion 2512 may be connected to the ground housing 230. Accordingly, the first ground contact 250 may enhance shielding performance between the first-first RF contact 211*a* and the first-second RF contact 211*b* by being electrically connected to the ground housing 230 through the first-first shield protrusion 2512, thereby realizing complete shielding. The first-first shield protrusion 2512 may be formed in a plate shape disposed in the vertical direction.

The first-first ground contact 251 may include a first-first ground connection member 2513 and a first-first ground mounting member 2514.

The first-first ground connection member 2513 is coupled to each of the first-first shield member 2511 and the first-first ground mounting member 2514. The first-first shield member 2511 and the first-first ground mounting member 2514 may be connected to each other through the first-first ground connection member 2513. The first-first ground connection member 2513 may be connected to the ground contact included in the mating connector. Accordingly, the first ground contact 250 may be electrically connected to the ground contact included in the mating connector by being connected to the ground contact included in the mating connector through the first-first ground connection member 2513. Accordingly, a gap generated as the first-first ground contact 251 and the first-second ground contact 252 are disposed to be spaced apart from each other along the second axial direction (Y-axis direction) may be shielded as the first ground contact 250 is connected to the ground contact included in the mating connector through the first-first ground connection member 2513. The first-first shield member 2511 may be coupled to the first-first ground connection member 2513. The first-first shield member 2511 may protrude from the first-first ground connection member 2513 along the first axial direction (X-axis direction). In this case, the first-first shield protrusion 2512 may protrude from the first-first shield member 2511 along the first axial direction (X-axis direction).

The first-first ground mounting member 2514 is mounted on the first board. The first-first ground mounting member 2514 may be grounded by being mounted on the first board. Accordingly, the first-first ground contact 251 may be grounded to the first board through the first-first ground mounting member 2514. The first-first ground mounting member 2514 may protrude from the first-first ground connection member 2513 along the second axial direction (Y-axis direction). In this case, the first-first ground mounting member 2514 may be disposed between the first-first RF contact 211*a* and the transmit contacts 220 with respect to the first axial direction (X-axis direction). The first-first ground mounting member 2514 may protrude from the first-first ground connection member 2513 by a length connectable to the ground housing 230 with respect to the second axial direction (Y-axis direction). In this case, the first-first ground mounting member 2514 and the first-first shield member 2511 protrude from the first-first ground connection member 2513 in different directions to be connected to different sidewalls included in the ground housing 230. Accordingly, since the first-first ground contact 251 and the ground housing 230 are electrically connected to each other while surrounding all sides of the first-first RF contact 211*a*, the board connector 200 according to the first embodiment may further enhance the shielding performance for the first-first RF contact 211*a*, thereby realizing complete shielding. The first-first ground mounting member 2514 may be formed in a plate shape disposed in a horizontal direction.

The first-first ground contact 251 may include a first-first ground protrusion 2515.

The first-first ground protrusion 2515 protrudes from the first-first shield member 2511. The first-first ground protrusion 2515 may be mounted on the first board. Accordingly, a mounting area in which the first-first ground contact 251 is mounted on the first board may be increased, so that the board connector 200 according to the first embodiment may further enhance the shielding performance using the first-first ground contact 251. The first-first ground protrusion 2515 may be mounted on the first board by passing through the insulation unit 240 and protruding from the insulation unit 240. The first-first ground protrusion 2515 may protrude from the first-first shield member 2511 along the vertical direction. The first-first ground protrusion 2515 may be formed in a plate shape disposed in the vertical direction.

The first-first ground contact 251 may include a first-first connection protrusion 2516.

The first-first connection protrusion 2516 protrudes from the first-first shield member 2511. The first-first connection protrusion 2516 may be connected to a ground housing of the mating connector. Accordingly, a connection area in which the first-first ground contact 251 is connected to the ground housing of the mating connector may be increased, so that the board connector 200 according to the first embodiment may further enhance the shielding performance using the first-first ground contact 251. The first-first connection protrusion 2516 may be connected to the ground housing of the mating connector by passing through the insulation unit 240 and protruding from the insulation unit 240. The first-first connection protrusion 2516 may be inserted into an insulation unit included in the mating connector to be connected to the ground housing included in the mating connector. In this case, a through hole into which the first-first connection protrusion 2516 is inserted may be formed in the insulation unit included in the mating connector. The first-first connection protrusion 2516 may protrude from the first-first shield member 2511 along the vertical direction. The first-first connection protrusion 2516 and the first-first ground protrusion 2515 may protrude from the first-first shield member 2511 in directions opposite to each other with respect to the vertical direction. The first-first connection protrusion 2516 may be formed in a plate shape disposed in the vertical direction.

The first-second ground contact 252 may be located between the first-second RF contact 211*b* and the transmit contacts 220 with respect to the first axial direction (X-axis direction). Accordingly, the first-second ground contact 252 may shield between the first-second RF contact 211*b* and the transmit contacts 220. The first-second ground contact 252 may be disposed to be spaced apart from the first-first ground contact 251 with respect to the second axial direction (Y-axis direction). The first-second ground contact 252 and the first-first ground contact 251 may be formed in different shapes. For example, the first-second ground contact 252 may be formed in a shape that does not have the first-first shield member 2511, the first-first shield protrusion 2512, the first-first ground protrusion 2515, and the first-first connection protrusion 2516, which are included in the first-first ground contact 251. Accordingly, when compared with an embodiment in which the first-second ground contact 252 is formed in the same shape as the first-first ground contact 251, in the board connector 200 according to the first embodiment, not only the easiness of a manufacturing operation may be improved in manufacturing the first-second ground contact 252, but also material costs for manufacturing the first-second ground contact 252 may be reduced. In this case, shielding between the first-first RF contact 211*a* and the first-second RF contact 211*b* may be performed by the first-first ground contact 251.

The first-second ground contact 252 may include a first-second ground connection member 2521 and a first-second ground mounting member 2522.

The first-second ground connection member 2521 is provided to be connected to the ground contact included in the mating connector. Accordingly, the first ground contact 250 may be electrically connected to the ground contact included in the mating connector by being connected to the ground contact included in the mating connector through the first-second ground connection member 2521. Accordingly, the gap generated as the first-second ground contact 252 and the first-first ground contact 251 are disposed to be spaced apart from each other along the second axial direction (Y-axis direction) may be shielded as the first ground contact 250 is connected to the ground contact included in the mating connector through the first-second ground connection member 2521. In this case, both the first-second ground connection member 2521 and the first-first ground connection member 2513 may be connected to the ground contact included in the mating connector.

The first-second ground mounting member 2522 is mounted on the first board. The first-second ground mounting member 2522 may be grounded by being mounted on the first board. Accordingly, the first-second ground contact 252 may be grounded to the first board through the first-second ground mounting member 2522. The first-second ground mounting member 2522 may protrude from the first-second ground connection member 2521 along the second axial direction (Y-axis direction). In this case, the first-second ground mounting member 2522 may be disposed between the first-second RF contact 211*b* and the transmit contacts 220 with respect to the first axial direction (X-axis direction). The first-second ground mounting member 2522 may protrude from the first-second ground connection member 2521 by a length connectable to the ground housing 230 with respect to the second axial direction (Y-axis direction). In this case, the first-second ground mounting member 2522 and the first-first ground mounting member 2514 may protrude in opposite directions to be respectively connected to the sidewalls of the ground housing 230 facing each other. Accordingly, the board connector 200 according to the first embodiment may further enhance the shielding performance between the first RF contacts 211 and the transmit contact 220. The first-second ground mounting member 2522 may be formed in a plate shape disposed in the horizontal direction.

As described above, in the board connector 200 according to the first embodiment, a first ground loop 250*a* (illustrated in FIG. 5) for the first-first RF contact 211*a* and the first-second RF contact 211*b* may be realized using the first-first ground contact 251, the first-second ground contact 252, and the ground housing 230. Accordingly, the board connector 200 according to the first embodiment may further enhance the shielding performance for the first-first RF contact 211*a* and the first-second RF contact 211*b* using the first ground loop 250*a*, thereby realizing complete shielding for the first-first RF contact 211*a* and the first-second RF contact 211*b*.

Referring to FIGS. 2 to 9, when the plurality of second RF contacts 212 are provided, the second ground contact 260 may shield between the second RF contacts 212 and the transmit contacts 220 with respect to the first axial direction (X-axis direction), and also, shield between the second RF contacts 212 with respect to the second axial direction (Y-axis direction). Accordingly, by using the second ground contact 260, the board connector 200 according to the first embodiment may realize a shielding function for between the second RF contacts 212 and the transmit contacts 220, and also, additionally realize a shielding function for between the second RF contacts 212. Accordingly, the board connector 200 according to the first embodiment may be realized to transmit a wider variety of RF signals using the second RF contacts 212, thereby improving versatility applicable to a wider variety of electronic products.

A second-first RF contact 212*a* among the second RF contacts 212 and a second-second RF contact 212*b* among the second RF contacts 212 may be coupled to the insulation unit 240 so as to be spaced apart from each other along the second axial direction (Y-axis direction). In FIG. 5, the board connector 200 according to the first embodiment is illustrated as including two second RF contacts 212 realized as the second-first RF contact 212*a* and the second-second RF contact 212*b*, but the present disclosure is not limited thereto, and the board connector 200 according to the first embodiment may also include three or more second RF contacts 212. Meanwhile, in the present specification, descriptions will be made on the basis of the case in which the board connector 200 according to the first embodiment includes the second-first RF contact 212*a* and the second-second RF contact 212*b*.

When the second-first RF contact 212*a* and the second-second RF contact 212*b* are provided, the second ground contact 260 may include a second-first ground contact 261 and a second-second ground contact 262.

The second-first ground contact 261 may be located between the second-first RF contact 212*a* and the transmit contacts 220 with respect to the first axial direction (X-axis direction). Accordingly, the second-first ground contact 261 may shield between the second-first RF contact 212*a* and the transmit contacts 220.

The second-first ground contact 261 may include a second-first shield member 2611.

The second-first shield member 2611 may be located between the second-first RF contact 212*a* and the second-second RF contact 212*b* with respect to the second axial direction (Y-axis direction). Accordingly, the second-first ground contact 261 may shield between the second-first RF contact 212*a* and the second-second RF contact 212*b* using the second-first shield member 2611. Accordingly, even though the second-first RF contact 212*a* and the second-second RF contact 212*b* transmit different RF signals, the board connector 200 according to the first embodiment may prevent signals or the like from being interfered between the second-first RF contact 212*a* and the second-second RF contact 212*b* using the second-first shield member 2611. Accordingly, the board connector 200 according to the first embodiment is realized to stably transmit a wider variety of RF signals using the second-first RF contact 212*a* and the second-second RF contact 212*b*. The second-first shield member 2611 may be formed in a plate shape disposed in the vertical direction between the second-first RF contact 212*a* and the second-second RF contact 212*b*.

The second-first shield member 2611 may be disposed to be spaced apart from each of the second-first RF contact 212*a* and the second-second RF contact 212*b* with respect to the second axial direction (Y-axis direction) by the same distance. Accordingly, in the board connector 200 according to the first embodiment, a deviation between shielding performance for the second-first RF contact 212*a* and shielding performance for the second-second RF contact 212*b* may be reduced. Accordingly, the board connector 200 according to the first embodiment may stably realize a shielding function for each the second-first RF contact 212*a* and the second-second RF contact 212*b* using the second-first shield member 2611.

The second-first ground contact 261 may include a second-first shield protrusion 2612.

The second-first shield protrusion 2612 protrudes from the second-first shield member 2611. The second-first shield protrusion 2612 may be connected to the ground housing 230. Accordingly, the second ground contact 260 may enhance the shielding performance between the second-first RF contact 212*a* and the second-second RF contact 212*b* by being electrically connected to the ground housing 230 through the second-first shield protrusion 2612, thereby realizing complete shielding. The second-first shield protrusion 2612 may be formed in a plate shape disposed in the vertical direction.

The second-first ground contact 261 may include a second-first ground connection member 2613 and a second-first ground mounting member 2614.

The second-first ground connection member 2613 is coupled to each of the second-first shield member 2611 and the second-first ground mounting member 2614. The second-first shield member 2611 and the second-first ground mounting member 2614 may be connected to each other through the second-first ground connection member 2613. The second-first ground connection member 2613 may be connected to the ground contact included in the mating connector. Accordingly, the second ground contact 260 may be electrically connected to the ground contact included in the mating connector by being connected to the ground contact included in the mating connector through the second-first ground connection member 2613. Accordingly, a gap generated as the second-first ground contact 261 and the second-second ground contact 262 are disposed to be spaced apart from each other along the second axial direction (Y-axis direction) may be shielded as the second ground contact 260 is connected to the ground contact included in the mating connector through the second-first ground connection member 2613. The second-first shield member 2611 may be coupled to the second-first ground connection member 2613. The second-first shield member 2611 may protrude from the second-first ground connection member 2613 along the first axial direction (X-axis direction). In this case, the second-first shield protrusion 2612 may protrude from the second-first shield member 2611 along the first axial direction (X-axis direction).

The second-first ground mounting member 2614 is mounted on the first board. The second-first ground mounting member 2614 may be grounded by being mounted on the first board. Accordingly, the second-first ground contact 261 may be grounded to the first board through the second-first ground mounting member 2614. The second-first ground mounting member 2614 may protrude from the second-first ground connection member 2613 along the second axial direction (Y-axis direction). In this case, the second-first ground mounting member 2614 may be disposed between the second-first RF contact 212*a* and the transmit contacts 220 with respect to the first axial direction (X-axis direction). The second-first ground mounting member 2614 may protrude from the second-first ground connection member 2613 by a length connectable to the ground housing 230 with respect to the second axial direction (Y-axis direction). In this case, the second-first ground mounting member 2614 and the second-first shield member 2611 protrude in different directions from the second-first ground connection member 2613 to be connected to different sidewalls included in the ground housing 230. Accordingly, since the second-first ground contact 261 and the ground housing 230 are electrically connected to each other while surrounding all sides of the second-first RF contact 212*a*, the board connector 200 according to the first embodiment may further enhance the shielding performance for the second-first RF contact 212*a*, thereby realizing complete shielding. The second-first ground mounting member 2614 may be formed in a plate shape disposed in the horizontal direction.

The second-first ground contact 261 may include a second-first ground protrusion 2615.

The second-first ground protrusion 2615 protrudes from the second-first shield member 2611. The second-first ground protrusion 2615 may be mounted on the first board. Accordingly, a mounting area in which the second-first ground contact 261 is mounted on the first board may be increased, so that the board connector 200 according to the first embodiment may further enhance the shielding performance using the second-first ground contact 261. The second-first ground protrusion 2615 may be mounted on the first board by passing through the insulation unit 240 and protruding from the insulation unit 240. The second-first ground protrusion 2615 may protrude from the second-first shield member 2611 along the vertical direction. The second-first ground protrusion 2615 may be formed in a plate shape disposed in the vertical direction.

The second-first ground contact 261 may include a second-first connection protrusion 2616.

The second-first connection protrusion 2616 protrudes from the second-first shield member 2611. The second-first connection protrusion 2616 may be connected to the ground housing of the mating connector. Accordingly, a connection area in which the second-first ground contact 261 is connected to the ground housing of the mating connector may be increased, so that the board connector 200 according to the first embodiment may further enhance the shielding performance using the second-first ground contact 261. The second-first connection protrusion 2616 may be connected to the ground housing of the mating connector by passing through the insulation unit 240 and protruding from the insulation unit 240. The second-first connection protrusion 2616 may be inserted into the insulation unit included in the mating connector to be connected to the ground housing included in the mating connector. In this case, a through hole into which the second-first connection protrusion 2616 is inserted may be formed in the insulation unit included in the mating connector. The second-first connection protrusion 2616 may protrude from the second-first shield member 2611 along the vertical direction. The second-first connection protrusion 2616 and the second-first ground protrusion 2615 may protrude from the second-first shield member 2611 in directions opposite to each other with respect to the vertical direction. The second-first connection protrusion 2616 may be formed in a plate shape disposed in the vertical direction.

The second-second ground contact 262 may be located between the second-second RF contact **212*b* and the transmit contacts 220 with respect to the first axial direction (X-axis direction). Accordingly, the second-second ground contact 262 may shield between the second-second RF contact 212*b* and the transmit contacts 220. The second-second ground contact 262 may be disposed to be spaced apart from the second-first ground contact 261 with respect to the second axial direction (Y-axis direction). The second-second ground contact 262 and the second-first ground contact 261 may be formed in different shapes. For example, the second-second ground contact 262 may be formed in a shape that does not have the second-first shield member 2611, the second-first shield protrusion 2612, the second-first ground protrusion 2615, and the second-first connection protrusion 2616, which are included in the second-first ground contact 261. Accordingly, when compared with an embodiment in which the second-second ground contact 262 is formed in the same shape as the second-first ground contact 261, in the board connector 200 according to the first embodiment, not only the easiness of a manufacturing operation may be improved in manufacturing the second-second ground contact 262, but also material costs for manufacturing the second-second ground contact 262 may be reduced. In this case, shielding between the second-first RF contact 212*a* and the second-second RF contact 212*b* may be performed by the second-first ground contact 261**.

The second-second ground contact 262 may include a second-second ground connection member 2621 and a second-second ground mounting member 2622.

The second-second ground connection member 2621 is provided to be connected to the ground contact included in the mating connector. Accordingly, the second ground contact 260 may be electrically connected to the ground contact included in the mating connector by being connected to the ground contact included in the mating connector through the second-second ground connection member 2621. Accordingly, the gap generated as the second-second ground contact 262 and the second-first ground contact 261 are disposed to be spaced apart from each other along the second axial direction (Y-axis direction) may be shielded as the second ground contact 260 is connected to the ground contact included in the mating connector through the second-second ground connection member 2621. In this case, both the second-second ground connection member 2621 and the second-first ground connection member 2613 may be connected to the ground contact included in the mating connector.

The second-second ground mounting member 2622 is mounted on the first board. The second-second ground mounting member 2622 may be grounded by being mounted on the first board. Accordingly, the second-second ground contact 262 may be grounded to the first board through the second-second ground mounting member 2622. The second-second ground mounting member 2622 may protrude from the second-second ground connection member 2621 along the second axial direction (Y-axis direction). In this case, the second-second ground mounting member 2622 may be disposed between the second-second RF contact **212*b* and the transmit contacts 220 with respect to the first axial direction (X-axis direction). The second-second ground mounting member 2622 may protrude from the second-second ground connection member 2621 by a length connectable to the ground housing 230 with respect to the second axial direction (Y-axis direction). In this case, the second-second ground mounting member 2622 and the second-first ground mounting member 2614 may protrude in opposite directions to be respectively connected to the sidewalls of the ground housing 230 facing each other. Accordingly, the board connector 200 according to the first embodiment may further enhance the shielding performance between the second RF contacts 212 and the transmit contact 220. The second-second ground mounting member 2622** may be formed in a plate shape disposed in the horizontal direction.

As described above, in the board connector 200 according to the first embodiment, a second ground loop **260*a* (illustrated in FIG. 5) for the second-first RF contact 212*a* and the second-second RF contact 212*b* may be realized using the second-first ground contact 261, the second-second ground contact 262, and the ground housing 230. Accordingly, the board connector 200 according to the first embodiment may further enhance the shielding performance for the second-first RF contact 212*a* and the second-second RF contact 212*b* using the second ground loop 260*a*, thereby realizing complete shielding for the second-first RF contact 212*a* and the second-second RF contact 212*b***.

Here, the second-first ground contact 261 and the first-first ground contact 251 may be formed in the same shape. The second-second ground contact 262 and the first-second ground contact 252 may be formed in the same shape. Accordingly, in the board connector 200 according to the first embodiment, the easiness of a manufacturing operation may be improved in manufacturing each of the second-first ground contact 261, the first-first ground contact 251, the second-second ground contact 262, and the first-second ground contact 252.

In this case, as shown in FIG. 5, the second-first ground contact 261 and the first-first ground contact 251 may be disposed to be point-symmetric with respect to a symmetry point SP. The symmetry point SP is a point spaced apart from each of both sidewalls **230*b* and 230*c* of the ground housing 230, which are disposed to be spaced apart from each other with respect to the first axial direction (X-axis direction), by the same distance, and also, spaced apart from each of both sidewalls 230*d* and 230*e* of the ground housing 230, which are disposed to be spaced apart from each other with respect to the second axial direction (Y-axis direction), by the same distance. Accordingly, in the board connector 200 according to the first embodiment, the second-first ground contact 261 and the first-first ground contact 251 are formed in the same shape as each other and realized differently only in arrangement directions, and thus the easiness of a manufacturing operation may be further improved in manufacturing the second-first ground contact 261 and the first-first ground contact 251. As shown in FIG. 5, the second-second ground contact 262 and the first-second ground contact 252 may be disposed to be point-symmetric with respect to the symmetry point SP. Accordingly, in the board connector 200 according to the first embodiment, the second-second ground contact 262 and the first-second ground contact 252 are formed in the same shape and realized differently only in arrangement directions, and thus the easiness of a manufacturing operation may be further improved in manufacturing the second-second ground contact 262 and the first-second ground contact 252. In this case, the second-first RF contact 212***a* and the first-first RF contact 211*a* may be disposed to be point-symmetric on the basis of the symmetry point SP. The second-second RF contact 212*b* and the first-second RF contact 211*b* may be disposed to be point-symmetric with respect to the symmetry point SP.

Referring to FIGS. 2 to 10, in the board connector 200 according to the first embodiment, the ground housing 230 may be realized as follows.

The ground housing 230 may include a ground inner wall 231, a ground outer wall 232, and a ground connection wall 233.

The ground inner wall 231 faces the insulation unit 240. The ground inner wall 231 may be disposed to face the inner side space 230*a*. The first-first ground contact 251 and the second-first ground contact 261 may each be connected to the ground inner wall 231. The ground inner wall 231 may include a first sub-ground inner wall 2311, a second sub-ground inner wall 2312, a third sub-ground inner wall 2313, and a fourth sub-ground inner wall 2314.

The first sub-ground inner wall 2311 and the second sub-ground inner wall 2312 may be disposed to face each other with respect to the first axial direction (X-axis direction). The third sub-ground inner wall 2313 and the fourth sub-ground inner wall 2314 may be disposed to face each other with respect to the second axial direction (Y-axis direction). The first sub-ground inner wall 2311, the second sub-ground inner wall 2312, the third sub-ground inner wall 2313, and the fourth sub-ground inner wall 2314 may be coupled to the ground connection wall 233 at locations spaced apart from each other. Each of the first sub-ground inner wall 2311, the second sub-ground inner wall 2312, the third sub-ground inner wall 2313, and the fourth sub-ground inner wall 2314 may elastically move with respect to a portion coupled to the ground connection wall 233 to press the insulation unit 240. Accordingly, the board connector 200 according to the first embodiment may enhance a coupling force between the ground housing 230 and the insulation unit 240. In addition, when the mating connector is inserted into the inner side space 230*a*, each of the first sub-ground inner wall 2311, the second sub-ground inner wall 2312, the third sub-ground inner wall 2313, and the fourth sub-ground inner wall 2314 may be pushed by the mating connector to more strongly press the insulation unit 240, thereby further increasing the coupling force between the ground housing 230 and the insulation unit 240.

The ground outer wall 232 is spaced apart from the ground inner wall 231. The ground outer wall 232 may be disposed outside the ground inner wall 231. The ground outer wall 232 may be disposed to surround all sides of the ground inner wall 231. The ground outer wall 232 and the ground inner wall 231 may be realized as shielding walls surrounding the sides of the inner side space 230*a*. The first RF contact 211 and the second RF contact 212 may be located in the inner side space 230*a* surrounded by the shielding walls. Accordingly, the ground housing 230 may realize a shielding function for the RF contacts 210 using the shielding walls. Accordingly, the board connector 200 according to the first embodiment may contribute to further improving the EMI shielding performance and the EMC performance using the shielding walls.

The ground outer wall 232 may be grounded by being mounted on the first board. In this case, the ground housing 230 may be grounded through the ground outer wall 232. When one end of the ground outer wall 232 is coupled to the ground connection wall 233, the other end of the ground outer wall 232 may be mounted on the first board. In this case, the ground outer wall 232 may be formed at a higher height than the ground inner wall 231.

The ground outer wall 232 may be connected to the ground housing of the mating connector that is inserted into the inner side space 230*a*. For example, as shown in FIGS. 8 and 9, the ground outer wall 232 may be connected to a ground housing 330 of the mating connector. As described above, the board connector 200 according to the first embodiment may further enhance the shielding function through the connection between the ground housing 230 and the ground housing of the mating connector. In addition, the board connector 200 according to the first embodiment may reduce electrical adverse effects such as crosstalk, which may be generated by mutual capacitance or induction between adjacent terminals due to the connection between the ground housing 230 and the ground housing of the mating connector. In this case, the board connector 200 according to the first embodiment may secure a path through which electromagnetic waves are introduced into at least one of the first board and the second board, thereby further enhancing the EMI shielding performance.

The ground connection wall 233 is coupled to each of the ground inner wall 231 and the ground outer wall 232. The ground connection wall 233 may be disposed between the ground inner wall 231 and the ground outer wall 232. The ground inner wall 231 and the ground outer wall 232 may be electrically connected to each other through the ground connection wall 233. Accordingly, when the ground outer wall 232 is mounted on the first board and grounded, the ground connection wall 233 and the ground inner wall 231 may also be grounded, thereby realizing a shielding function.

The ground connection wall 233 may be coupled to one end of each of the ground outer wall 232 and the ground inner wall 231. Based on FIG. 10, one end of the ground outer wall 232 may correspond to an upper end of the ground outer wall 232, and one end of the ground inner wall 231 may correspond to an upper end of the ground inner wall 231. The ground connection wall 233 may be formed in a plate shape disposed in the horizontal direction, and the ground outer wall 232 and the ground inner wall 231 may each be formed in a plate shape disposed in the vertical direction. The ground connection wall 233, the ground outer wall 232, and the ground inner wall 231 may be integrally formed.

The ground connection wall 233 may be connected to the ground housing of the mating connector that is inserted into the inner side space 230*a*. Accordingly, since the ground outer wall 232 and the ground connection wall 233 are connected to the ground housing of the mating connector, the board connector 200 according to the first embodiment may further enhance the shielding function by increasing a contact area between the ground housing 230 and the ground housing of the mating connector.

Here, the ground housing 230 may realize a shielding function for the first RF contacts 211 together with the first ground contact 250. The ground housing 230 may realize a shielding function for the second RF contacts 212 together with the second ground contact 260.

In this case, as shown in FIG. 5, the ground housing 230 may include a first shielding wall 230*b*, a second shielding wall 230*c*, a third shielding wall 230*d*, and a fourth shielding wall 230*e*. Each of the first shielding wall 230*b*, the second shielding wall 230*c*, the third shielding wall 230*d*, and the fourth shielding wall 230*e* may be realized by the ground inner wall 231, the ground outer wall 232, and the ground connection wall 233. The first shielding wall 230*b* and the second shielding wall 230*c* are disposed to face each other with respect to the first axial direction (X-axis direction). The first RF contacts 211 and the second RF contacts 212 may be located between the first shielding wall 230*b* and the second shielding wall 230*c* with respect to the first axial direction (X-axis direction). The first RF contacts 211 may be located at locations each having a shorter separation distance from the first shielding wall 230*b* than a separation distance from the second shielding wall 230*c* with respect to the first axial direction (X-axis direction). The second RF contacts 212 may be located at locations each having a shorter separation distance from the second shielding wall 230*c* than a separation distance from the first shielding wall 230*b* with respect to the first axial direction (X-axis direction). The third shielding wall 230*d* and the fourth shielding wall 230*e* are disposed to face each other with respect to the second axial direction (Y-axis direction). The first RF contacts 211 and the second RF contacts 212 may be located between the third shielding wall 230*d* and the fourth shielding wall 230*e* with respect to the second axial direction (Y-axis direction).

The first ground contact 250 may be disposed between the first RF contacts 211 and the transmit contacts 220 with respect to the first axial direction (X-axis direction). Accordingly, the first RF contacts 211 may be located between the first shielding wall 230*b* and the first ground contact 250 with respect to the first axial direction (X-axis direction), and may be located between the third shielding wall 230*d* and the fourth shielding wall 230*e* with respect to the second axial direction (Y-axis direction). Thus, the board connector 200 according to the first embodiment may enhance the shielding function for the first RF contacts 211 using the first ground contact 250, the first shielding wall 230*b*, the third shielding wall 230*d*, and the fourth shielding wall 230*e*. The first ground contact 250, the first shielding wall 230*b*, the third shielding wall 230*d*, and the fourth shielding wall 230*e* are disposed at four sides of the first RF contacts 211 to realize a shielding force against RF signals. In this case, the first ground contact 250, the first shielding wall 230*b*, the third shielding wall 230*d*, and the fourth shielding wall 230*e* may realize the first ground loop 250*a* (illustrated in FIG. 5) for the first RF contacts 211. Accordingly, the board connector 200 according to the first embodiment may further enhance the shielding function for the first RF contacts 211 using the first ground loop 250*a*, thereby realizing complete shielding for the first RF contacts 211. In this case, the first RF contacts 211 may be located between the first sub-ground inner wall 2311 and the first ground contact 250 with respect to the first axial direction (X-axis direction), and also, located between the third sub-ground inner wall 2313 and the fourth sub-ground inner wall 2314 with respect to the second axial direction (Y-axis direction).

The second ground contact 260 may be disposed between the second RF contacts 212 and the transmit contacts 220 with respect to the first axial direction (X-axis direction). Accordingly, the second RF contacts 212 may be located between the second shielding wall 230*c* and the second ground contact 260 with respect to the first axial direction (X-axis direction) and may be located between the third shielding wall 230*d* and the fourth shielding wall 230*e* with respect to the second axial direction (Y-axis direction). Accordingly, the board connector 200 according to the first embodiment may enhance the shielding function for the second RF contacts 212 using the second ground contact 260, the second shielding wall 230*c*, the third shielding wall 230*d*, and the fourth shielding wall 230*e*. The second ground contact 260, the second shielding wall 230*c*, the third shielding wall 230*d*, and the fourth shielding wall 230*e* are disposed at four sides of the second RF contacts 212 to realize a shielding force against the RF signal. In this case, the second ground contact 260, the second shielding wall 230*c*, the third shielding wall 230*d*, and the fourth shielding wall 230*e* may realize the second ground loop 260*a* (illustrated in FIG. 5) for the second RF contacts 212. Accordingly, the board connector 200 according to the first embodiment may further enhance the shielding function for the second RF contacts 212 using the second ground loop 260*a*, thereby realizing complete shielding for the second RF contacts 212. In this case, the second RF contacts 212 may be located between the second sub-ground inner wall 2312 and the second ground contact 260 with respect to the first axial direction (X-axis direction), and also, located between the third sub-ground inner wall 2313 and the fourth sub-ground inner wall 2314 with respect to the second axial direction (Y-axis direction).

Figure 10:
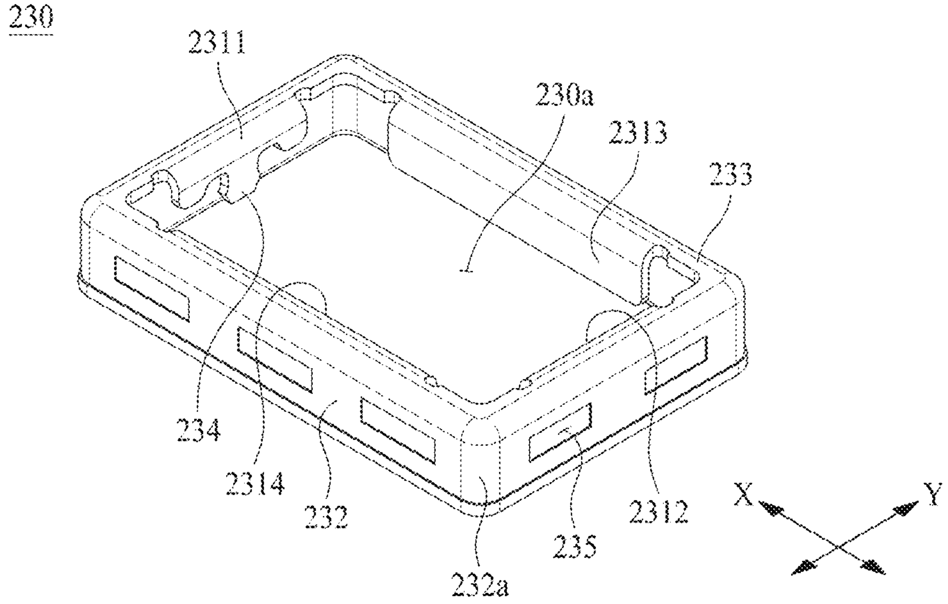
FIG. 10 is a schematic perspective view of a ground housing in the board connector according to the first embodiment.

The ground housing 230 may include a wedge member 234 (illustrated in FIG. 10).

The wedge member 234 protrudes from the ground inner wall 231. When the ground housing 230 is coupled to the insulation unit 240, the wedge member 234 may be wedged in the insulation unit 240 to fix the ground housing 230 and the insulation unit 240. Accordingly, the board connector 200 according to the first embodiment may more firmly couple the ground housing 230 and the insulation unit 240 using the wedge member 234. The wedge member 234 and the ground inner wall 231 may be integrally formed.

The wedge member 234 may include a first wedge member 234*a* (illustrated in FIG. 8) and a second wedge member 234*b* (illustrated in FIG. 8).

The first wedge member 234*a* protrudes from the first sub-ground inner wall 2311. When the ground housing 230 is coupled to the insulation unit 240, the first wedge member 234*a* may be wedged in the insulation unit 240 by being inserted into the insulation unit 240, thereby fixing the ground housing 230 and the insulation unit 240. The first-first ground contact 251 may be connected to the first wedge member 234*a*. In this case, the first-first shield protrusion 2512 may be electrically connected to the ground housing 230 by being connected to the first wedge member 234*a*. Accordingly, the first wedge member 234*a* may enhance the coupling force between the ground housing 230 and the insulation unit 240, and simultaneously, enhance the shielding performance between the first-first RF contact 211*a* and the first-second RF contact 211*b*.

The second wedge member 234*b* protrudes from the second sub-ground inner wall 2312. When the ground housing 230 is coupled to the insulation unit 240, the second wedge member 234*b* may be wedged in the insulation unit 240 by being inserted into the insulation unit 240, thereby fixing the ground housing 230 and the insulation unit 240. The second wedge member 234*b* and the first wedge member 234*a* may be disposed to face each other with respect to the first axial direction (X-axis direction). The second wedge member 234*b* may be connected to the second-first ground contact 261. In this case, the second-first shield protrusion 2612 may be electrically connected to the ground housing 230 by being connected to the second wedge member 234*b*. Accordingly, the second wedge member 234*b* may enhance the coupling force between the ground housing 230 and the insulation unit 240, and simultaneously, enhance the shielding performance between the second-first RF contact 212*a* and the second-second RF contact 212*b*.

Referring to FIGS. 2 to 14, the ground housing 230 may include the following configuration in order to further enhance the shielding function by improving a contact between the ground inner wall 231 and the ground housing of the mating connector.

Figure 11:
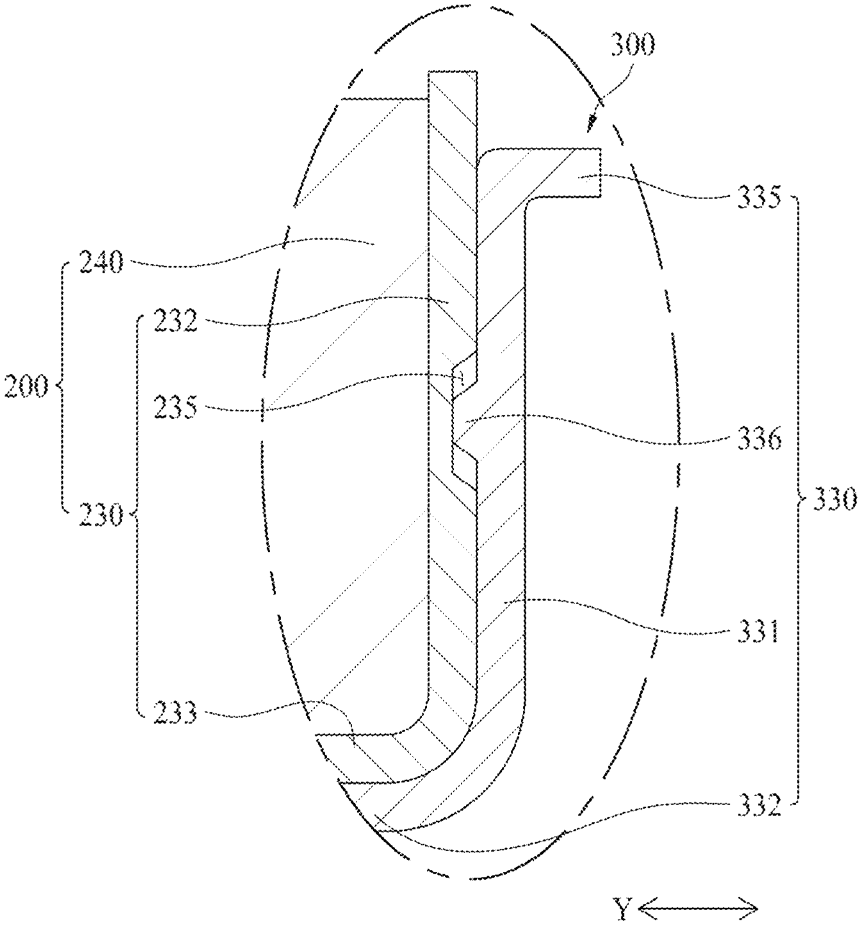
FIGS. 11 to 14 are enlarged schematic cross-sectional side views of portion A of FIG. 8, illustrating the state in which the board connector according to the first embodiment is coupled to the board connector according to the second embodiment.

First, as shown in FIG. 11, the ground housing 230 may include a connection groove 235. The connection groove 235 may be formed on an outer surface of the ground outer wall 232. The outer surface of the ground outer wall 232 is a surface facing a side opposite to the inner side space 230*a*. The connection groove 235 may be realized as a groove formed to a predetermined depth in the outer surface of the ground outer wall 232. The ground housing 330 included in the mating connector may be inserted into the connection groove 235. In this case, a connection protrusion 336 included in the ground housing 330 of the mating connector may be inserted into the connection groove 235. Accordingly, the board connector 200 according to the first embodiment may further enhance the shielding function for the first RF contact 211 and the second RF contact 212 by improving a contact between the ground housing 230 and the ground housing 330 included in the mating connector using the connection groove 235. In FIG. 11, the connection groove 235 is illustrated as being formed to have a longer length than the connection protrusion 336 with respect to the vertical direction, but the present disclosure is not limited thereto, and the connection groove 235 and the connection protrusion 336 may be formed to have lengths substantially equal to each other. Meanwhile, the ground outer wall 232 may support the connection protrusion 336 that is inserted into the connection groove 235, so that the connection protrusion 336 is prevented from being separated from the connection groove 235. The ground housing 230 may also include a plurality of connection grooves 235. In this case, the connection grooves 235 may be disposed to be spaced apart from each other along the outer surface of the ground outer wall 232.

Figure 12:
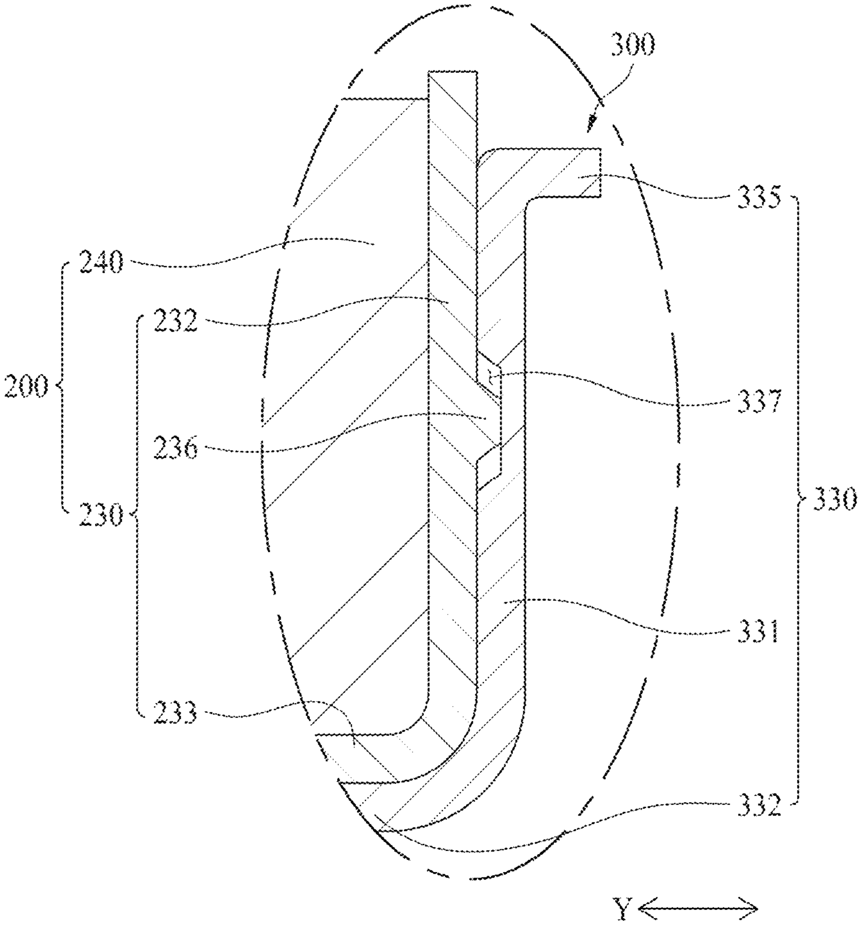

Next, as shown in FIG. 12, the ground housing 230 may also include a connection protrusion 236. The connection protrusion 236 may be formed on the outer surface of the ground outer wall 232. The connection protrusion 236 may protrude from the outer surface of the ground outer wall 232. The connection protrusion 236 may be inserted into the ground housing 330 included in the mating connector. In this case, the connection protrusion 236 may be inserted into a connection groove 337 included in the ground housing 330 of the mating connector. Accordingly, the board connector 200 according to the first embodiment may further enhance the shielding function for the first RF contact 211 and the second RF contact 212 by improving the contact between the ground housing 230 and the ground housing 330 included in the mating connector using the connection protrusion 236. In FIG. 12, the connection protrusion 236 is illustrated as being formed to have a shorter length than the connection groove 337 with respect to the vertical direction, but the present disclosure is not limited thereto, and the connection protrusion 236 and the connection groove 337 may be formed to have lengths substantially equal to each other. Meanwhile, the connection protrusion 236 is inserted into the connection groove 337 to be supported by the ground housing 330, so that the connection protrusion 236 may be prevented from being separated from the connection groove 337. The ground housing 230 may also include a plurality of connection protrusions 236. In this case, the connection protrusions 236 may be disposed to be spaced apart from each other along the outer surface of the ground outer wall 232.

Figure 13:
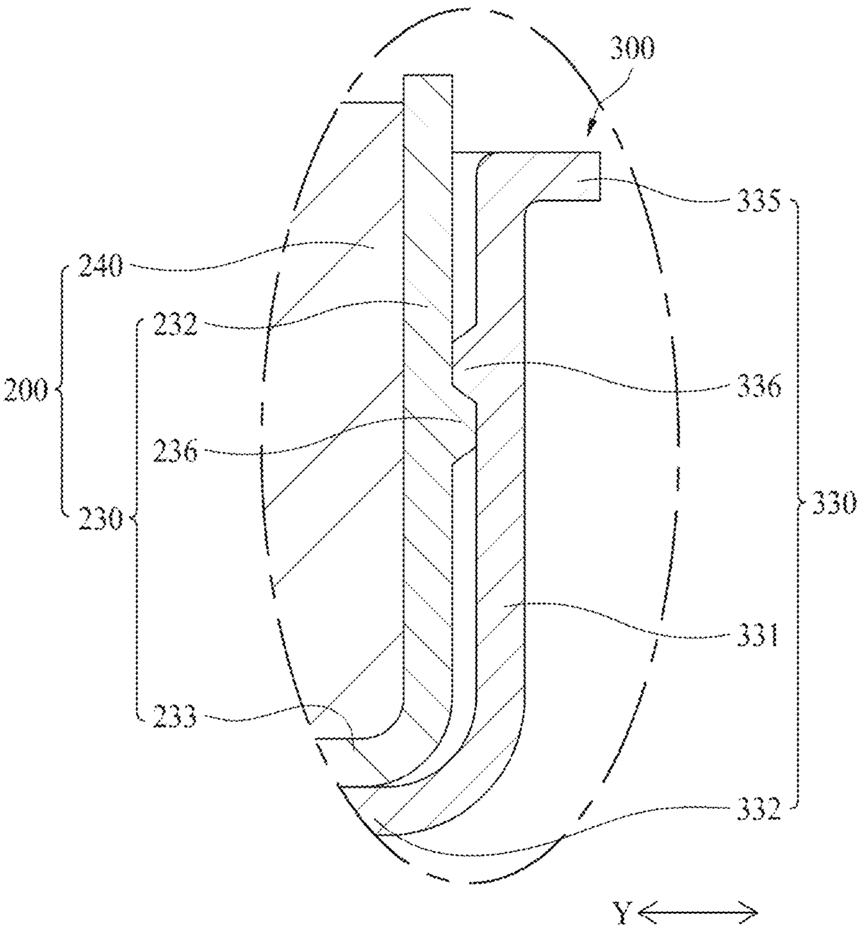

Next, as shown in FIG. 13, when the ground housing 230 includes the connection protrusion 236, the connection protrusion 236 may be supported by the connection protrusion 336 included in the ground housing 330 of the mating connector. Accordingly, the board connector 200 according to the first embodiment may further enhance the shielding function for the first RF contact 211 and the second RF contact 212 by improving the contact between the ground housing 230 and the ground housing 330 included in the mating connector using the connection protrusion 236. Meanwhile, the connection protrusion 236 may be disposed on a lower side of the connection protrusion 336 to be supported by the connection protrusion 336, so that the connection protrusion 236 may also be prevented from being separated from the connection protrusion 336.

Figure 14:
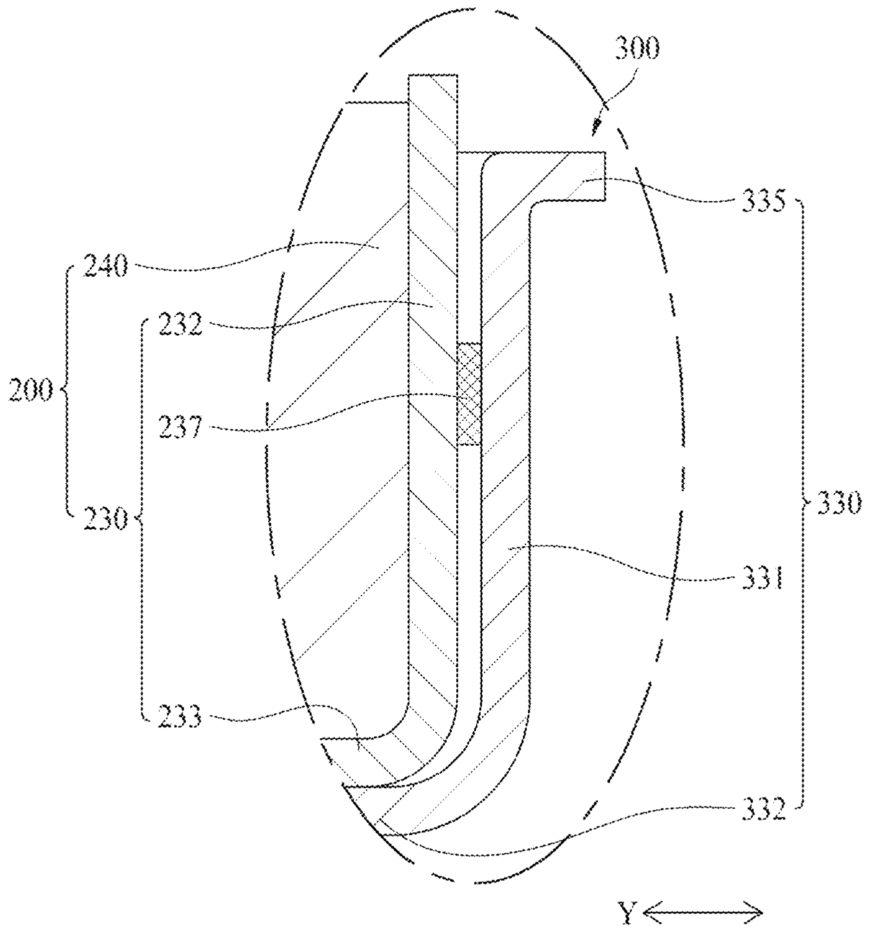

Next, as shown in FIG. 8, the ground housing 230 may be in contact with the ground housing 330 of the mating connector as the outer surface of the ground outer wall 232 is brought into surface contact with the ground housing 330 of the mating connector. In this case, a gap may occur between the outer surface of the ground outer wall 232 and the ground housing 330 of the mating connector, and in order to compensate for the gap, as shown in FIG. 14, the ground housing 230 may include a conductive member 237. The conductive member 237 may be coupled to the outer surface of the ground outer wall 232. The conductive member 237 may extend along the outer surface of the ground outer wall 232, including a corner portion 232*a* (illustrated in FIG. 10) included in the outer surface of the ground outer wall 232, to form a closed loop shape. Accordingly, the board connector 200 according to the first embodiment may further enhance the shielding function for the first RF contact 211 and the second RF contact 212 by improving the contact between the ground housing 230 and the ground housing 330 included in the mating connector using the conductive member 237. In addition, in the case of the embodiment using the connection protrusion 236 and the connection groove 235, it is difficult to realize the connection protrusion 236 and the connection groove 235 at the corner portion 232*a* included in the outer surface of the ground outer wall 232, but in the case of the embodiment using the conductive member 237, it is possible to improve the easiness of the operation of realizing the conductive member 237 at the corner portion 232*a* included in the outer surface of the ground outer wall 232. The conductive member 237 may be formed of an electrically conductive material to electrically connect the ground outer wall 232 and the ground housing 330 of the mating connector. For example, the conductive member 237 may be formed of metal. After the conductive member 237 is separately manufactured, the conductive member 237 may be coupled to the ground outer wall 232 by being mounted, attached, fastened, and the like to the outer surface of the ground outer wall 232. The conductive member 237 may also be coupled to the ground outer wall 232 by applying a conductive shielding material to the outer surface of the ground outer wall 232.

Figure 15:
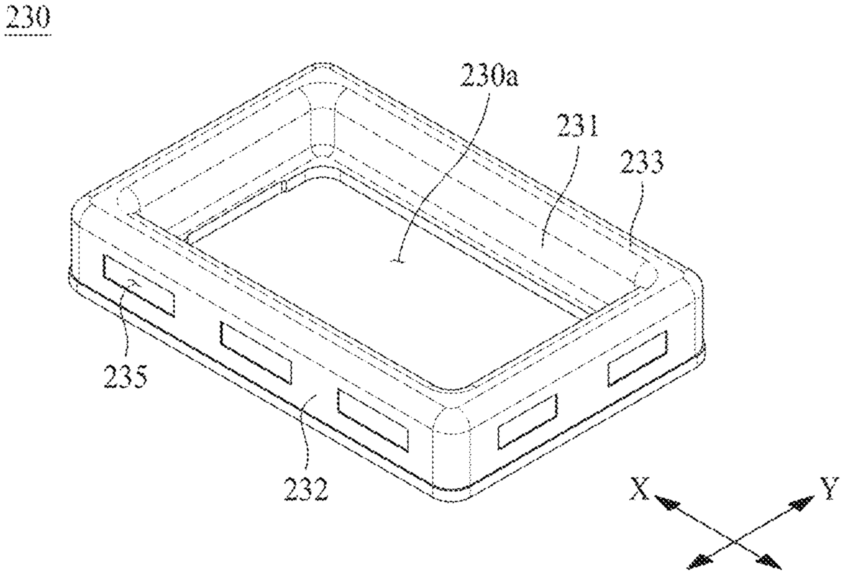
FIG. 15 is a schematic perspective view of a modified embodiment of the ground housing in the board connector according to the first embodiment.

Referring to FIG. 15, the ground housing 230 may be realized as double shielding walls. In this case, the ground inner wall 231 may be disposed to surround all sides of the inner side space 230*a*. Accordingly, the ground housing 230 may be realized as double shielding walls in which the ground inner wall 231 and the ground outer wall 232 are disposed to surround all sides of the inner side space 230*a*. Accordingly, the ground housing 230 may enhance the shielding function for the RF contacts 210 using the double shielding walls. Accordingly, the board connector 200 according to the first embodiment may contribute to further improving the EMI shielding performance and the EMC performance using the double shielding walls.

Referring to FIGS. 2 to 16, in the board connector 200 according to the first embodiment, the insulation unit 240 may be realized as follows.

The insulation unit 240 may include an insulating member 241, an insertion member 242, and a connecting member 243.

The insulating member 241 supports the RF contacts 210 and the transmit contacts 220. The insulating member 241 may be located in the inner side space 230*a*. The insulating member 241 may be located inside the ground inner wall 231. The insulating member 241 may be inserted into an inner side space included in the mating connector.

The insertion member 242 is inserted between the ground inner wall 231 and the ground outer wall 232. As the insertion member 242 is inserted between the ground inner wall 231 and the ground outer wall 232, the insulation unit 240 may be coupled to the ground housing 230. The insertion member 242 may be inserted between the ground inner wall 231 and the ground outer wall 232 in an interference fit manner. The insertion member 242 may be disposed outside the insulating member 241. The insertion member 242 may be disposed to surround the outside of the insulating member 241.

The connecting member 243 is coupled to each of the insertion member 242 and the insulating member 241. The insertion member 242 and the insulating member 241 may be connected to each other through the connecting member 243. The connecting member 243 may be formed to have a thickness less than that of each of the insertion member 242 and the insulating member 241 with respect to the vertical direction. Accordingly, a space may be provided between the insertion member 242 and the insulating member 241, and the mating connector may be inserted into the space. The connecting member 243, the insertion member 242, and the connecting member 243 may be integrally formed.

Figure 7:
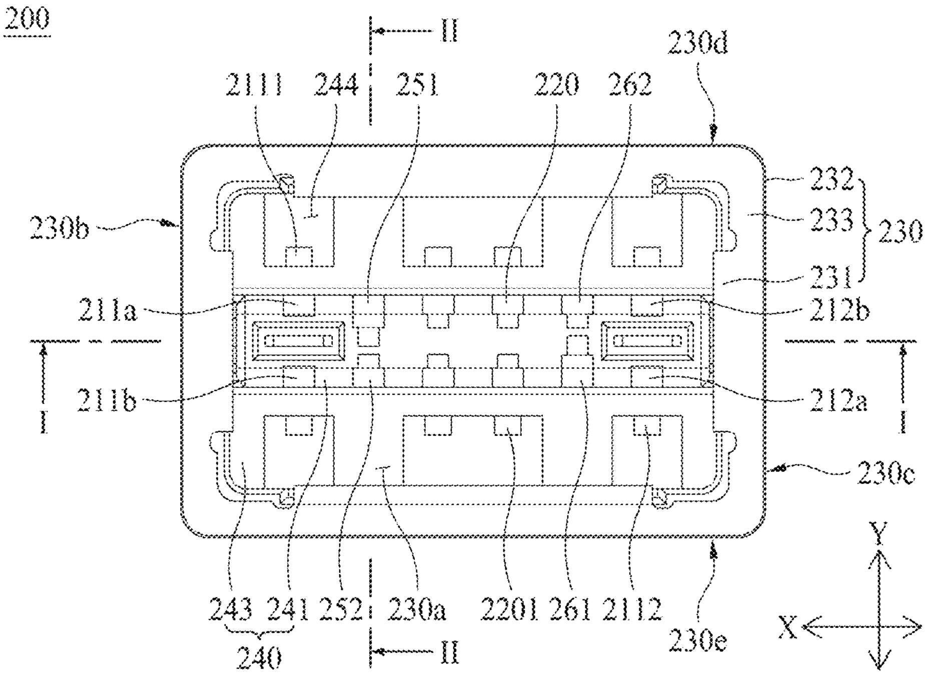
FIG. 7 is a schematic plan view of the board connector according to the first embodiment.

The insulation unit 240 may include a soldering inspection window 244 (illustrated in FIG. 7).

The soldering inspection window 244 may be formed by passing through the insulation unit 240. The soldering inspection window 244 may be used to inspect a state in which the first RF mounting members 2111 are mounted on the first board. In this case, the first RF contacts 211 may be coupled to the insulation unit 240 such that the first RF mounting members 2111 are located in the soldering inspection windows 244. Accordingly, the first RF mounting members 2111 are not covered by the insulation unit 240. Accordingly, in a state in which the board connector 200 according to the first embodiment is mounted on the first board, a worker may inspect the state, in which first RF mounting members 2111 is mounted on the first board, through the soldering inspection window 244. Accordingly, in the board connector 200 according to the first embodiment, even when all of the first RF contacts 211 including the first RF mounting members 2111 are located inside the ground housing 230, the accuracy of a mounting operation of mounting the first RF contacts 211 on the first board may be improved. The soldering inspection window 244 may be formed by passing through the insulating member 241.

The insulation unit 240 may also include a plurality of soldering inspection windows 244. In this case, the first RF mounting members 2111 may be located in different soldering inspection windows 244, respectively. The second RF mounting members 2121 and the transmission mounting members 2201 may be located in the soldering inspection windows 244, respectively. Accordingly, in the state in which the board connector 200 according to the first embodiment is mounted on the first board, a worker may inspect the state, in which the first RF mounting members 2111, the second RF mounting members 2121, and the transmission mounting members 2201 are mounted on the first board, through the soldering inspection windows 244. Accordingly, the board connector 200 according to the first embodiment may improve the accuracy of the operation of mounting the first RF contacts 211, the second RF contacts 212, and the transmit contacts 220 on the first board. The soldering inspection windows 244 may be formed by passing through the insulation unit 240 at locations spaced apart from each other.

Figure 16:
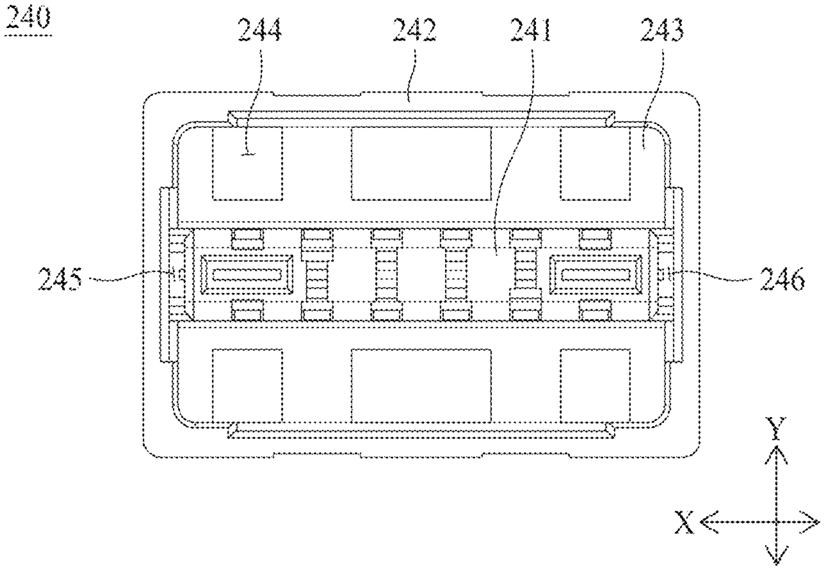
FIG. 16 is a schematic plan view of an insulation unit in the board connector according to the first embodiment.

The insulation unit 240 may include a first assembly groove 245 (illustrated in FIG. 16).

The first wedge member 234*a* (illustrated in FIG. 8) is inserted into the first assembly groove 245. As the first wedge member 234*a* is inserted into the first assembly groove 245, the first wedge member 234*a* may be wedged in the insulation unit 240 to fix the ground housing 230 and the insulation unit 240. The first assembly groove 245 may be realized as a groove formed to a predetermined depth in the insulating member 241. The first-first shield protrusion 2512 may be inserted into the first assembly groove 245. The first-first shield protrusion 2512 may be inserted into the first assembly groove 245 to be connected to the first wedge member 234*a*. Accordingly, the first-first ground contact 251 may be electrically connected to the ground housing 230.

The insulation unit 240 may include a second assembly groove 246 (illustrated in FIG. 16).

The second wedge member 234*b* (illustrated in FIG. 8) is inserted into the second assembly groove 246. As the second wedge member 234*b* is inserted into the second assembly groove 246, the second wedge member 234*b* may be wedged in the insulation unit 240 to fix the ground housing 230 and the insulation unit 240. The second assembly groove 246 may be realized as a groove formed to a predetermined depth in the insulating member 241. The second-first shield protrusion 2612 may be inserted into the second assembly groove 246. The second-first shield protrusion 2612 may be inserted into the second assembly groove 246 to be connected to the second wedge member 234*b*. Accordingly, the second-first ground contact 261 may be electrically connected to the ground housing 230.

<Board Connector 300 According to Second Embodiment>

Figure 17:
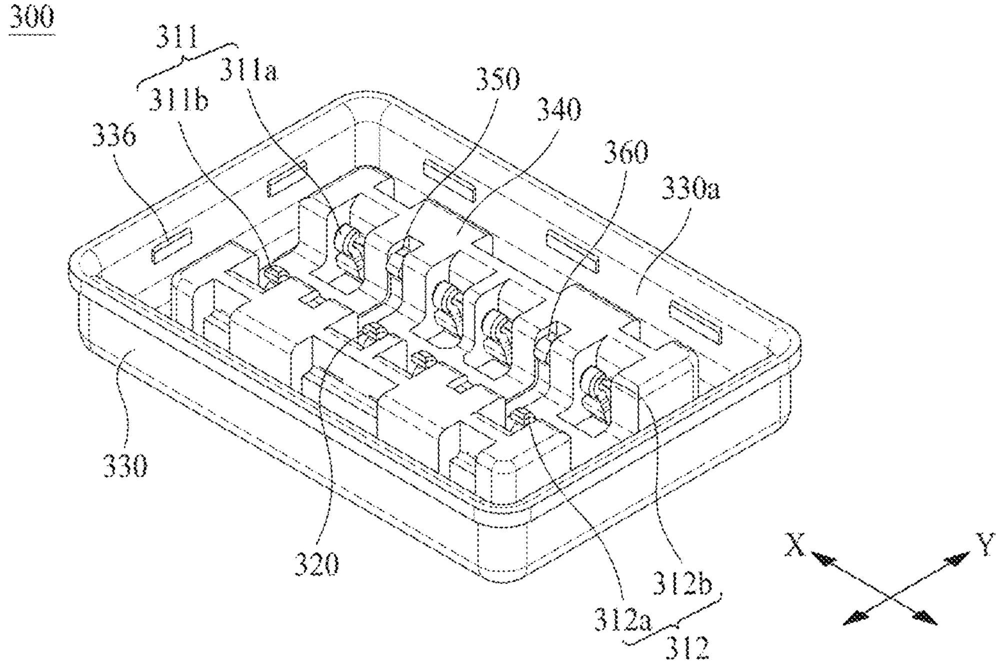
FIG. 17 is a schematic perspective view of the board connector according to the second embodiment.
Figure 18:
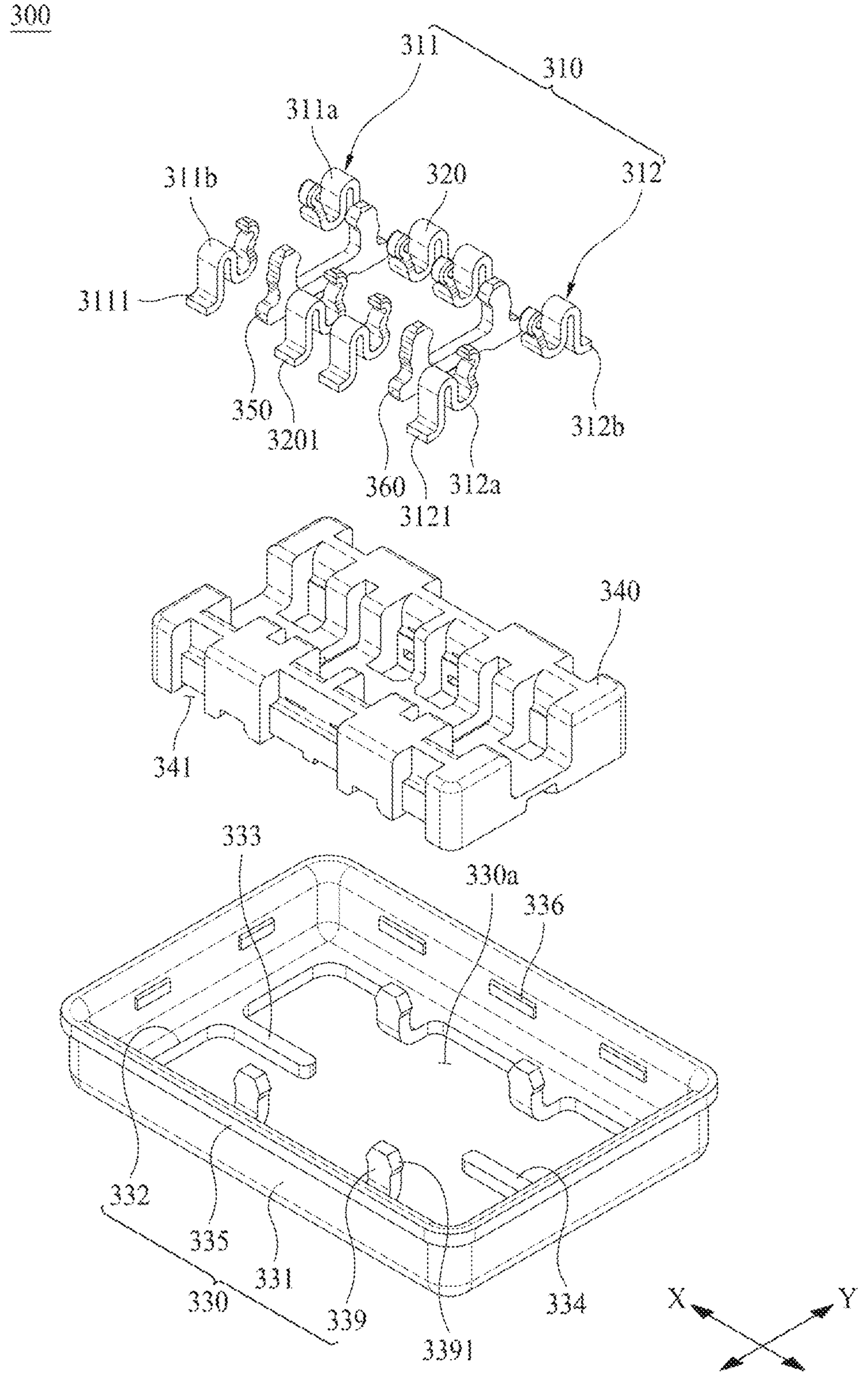
FIG. 18 is a schematic exploded perspective view of the board connector according to the second embodiment.

Referring to FIGS. 2, 17, and 18, the board connector 300 according to the second embodiment may include a plurality of RF contacts 310, a plurality of transmit contacts 320, a ground housing 330, and an insulation unit 340.

The RF contacts 310 are for transmitting RF signals. The RF contacts 310 may transmit ultra-high frequency RF signals. The RF contacts 310 may be supported by the insulation unit 340. The RF contacts 310 may be coupled to the insulation unit 340 through an assembly process. The RF contacts 310 may also be integrally molded with the insulation unit 340 through injection molding.

The RF contacts 310 may be disposed to be spaced apart from each other. The RF contacts 310 may be electrically connected to the second board by being mounted on the second board. The RF contacts 310 may be electrically connected to the first board, on which a mating connector is mounted, by being connected to RF contacts included in the mating connector. Accordingly, the second board and the first board may be electrically connected. In this case, the mating connector may be realized as the board connector 200 according to the first embodiment. Meanwhile, the mating connector in the board connector 200 according to the first embodiment may also be realized as the board connector 300 according to the second embodiment.

A first RF contact 311 among the RF contacts 310 and a second RF contact 312 among the RF contacts 310 may be spaced apart from each other along the first axial direction (X-axis direction). The first RF contact 311 and the second RF contact 312 may be supported by the insulation unit 340 at locations spaced apart from each other along the first axial direction (X-axis direction).

The first RF contact 311 may include a first RF mounting member 3111. The first RF mounting member 3111 may be mounted on the second board. Accordingly, the first RF contact 311 may be electrically connected to the second board through the first RF mounting member 3111. The first RF contact 311 may be formed of an electrically conductive material. For example, the first RF contact 311 may be formed of metal. The first RF contact 311 may be connected to any one of the RF contacts included in the mating connector.

The second RF contact 312 may include a second RF mounting member 3121. The second RF mounting member 3121 may be mounted on the second board. Accordingly, the second RF contact 312 may be electrically connected to the second board through the second RF mounting member 3121. The second RF contact 312 may be formed of an electrically conductive material. For example, the second RF contact 312 may be formed of metal. The second RF contact 312 may be connected to any one of the RF contacts included in the mating connector.

Referring to FIGS. 2, 16, and 17, the transmit contacts 320 are coupled to the insulation unit 340. The transmit contacts 320 may serve to transmit signals, data, and the like. The transmit contacts 320 may be coupled to the insulation unit 340 through an assembly process. The transmit contacts 320 may also be integrally molded with the insulation unit 340 through injection molding.

The transmit contacts 320 may be disposed between the first RF contact 311 and the second RF contact 312 with respect to the first axial direction (X-axis direction). Accordingly, in order to reduce RF signal interference between the first RF contact 311 and the second RF contact 312, the transmit contacts 320 may be disposed in a space in which the first RF contact 311 and the second RF contact 312 are spaced apart. Accordingly, the board connector 300 according to the second embodiment may not only reduce RF signal interference by increasing a distance by which the first RF contact 311 and the second RF contact 312 are spaced apart from each other, but also improve space utilization for the insulation unit 340 by disposing the transmit contacts 320 in a separation space for this purpose.

The transmit contacts 320 may be disposed to be spaced apart from each other. The transmit contacts 320 may be electrically connected to the second board by being mounted on the second board. In this case, a transmission mounting member 3201 included in each of the transmit contacts 320 may be mounted on the second board. The transmit contacts 320 may be formed of an electrically conductive material. For example, the transmit contacts 320 may be formed of metal. The transmit contacts 320 may be electrically connected to the second board, on which the mating connector is mounted, by being connected to transmit contacts included in the mating connector. Accordingly, the second board and the first board may be electrically connected.

Meanwhile, in FIG. 18, the board connector 300 according to the second embodiment is illustrated as including four transmit contacts 320, but the present disclosure is not limited thereto, and the board connector 300 according to the second embodiment may also include five or more transmit contacts 320. The transmit contacts 320 may be spaced apart from each other along the first axial direction (X-axis direction) and the second axial direction (Y-axis direction).

Figure 19:
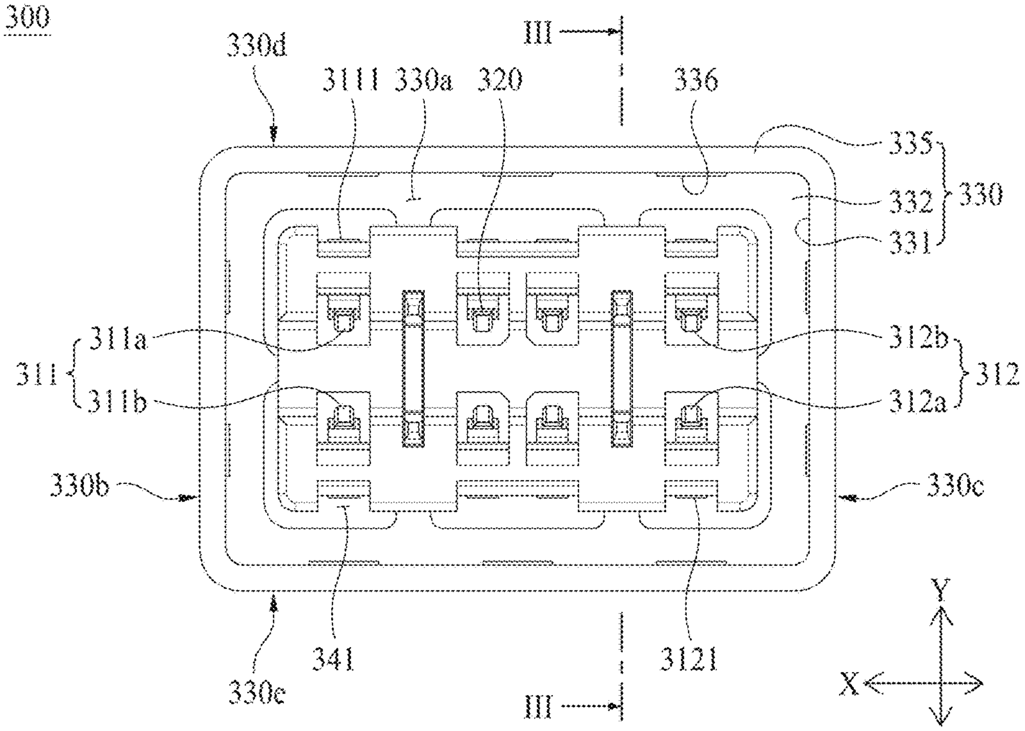
FIG. 19 is a schematic plan view of the board connector according to the second embodiment.

Referring to FIGS. 17 to 19, the ground housing 330 is coupled to the insulation unit 340. The ground housing 330 may be grounded by being mounted on the second board. Accordingly, the ground housing 330 may realize a shielding function against signals, electromagnetic waves, or the like for the RF contacts 310. In this case, the ground housing 330 may prevent electromagnetic waves generated from the RF contacts 310 from interfering with signals of circuit components located around the electronic device, and may prevent electromagnetic waves generated from the circuit components located around the electronic device from interfering with RF signals transmitted by the RF contacts 310. Accordingly, the board connector 300 according to the second embodiment may contribute to improving EMI shielding performance and EMC performance using the ground housing 330. The ground housing 330 may be formed of an electrically conductive material. For example, the ground housing 330 may be formed of metal.

The ground housing 330 may be disposed to surround sides of an inner side space 330*a*. The insulation unit 340 may be located in the inner side space 330*a*. All of the first RF contact 311, the second RF contact 312, and the transmit contacts 220 may be located in the inner side space 330*a*. In this case, all of the first RF mounting member 3111, the second RF mounting member 3121, and the transmission mounting members 3201 may also be located in the inner side space 330*a*. Accordingly, the ground housing 330 may enhance a shielding function for the first RF contact 311 and the second RF contact 312 by realizing shielding walls for all of the first RF contact 311 and the second RF contact 312, thereby realizing complete shielding. The mating connector may be inserted into the inner side space 330*a*. In this case, a portion of the mating connector may be inserted into the inner side space 330*a*, and a portion of the board connector 300 according to the second embodiment may be inserted into an inner side space included in the mating connector.

The ground housing 330 may be disposed to surround all sides of the inner side space 330*a*. The inner side space 330*a* may be disposed inside the ground housing 330. When the entire ground housing 330 is formed in a rectangular loop shape, the inner side space 330*a* may be formed in a rectangular parallelepiped shape. In this case, the ground housing 330 may be disposed to surround four sides of the inner side space 330*a*.

The ground housing 330 may be integrally formed as one piece without a seam. The ground housing 330 may be integrally formed as one piece without a seam by a metal injection method, such as a metal die casting method, an MIM method, or the like. The ground housing 330 may be integrally formed as one piece without a seam by a CNC process, an MCT process, or the like.

Referring to FIGS. 17 to 19, the insulation unit 340 supports the RF contacts 310. The RF contacts 310 and the transmit contacts 320 may be coupled to the insulation unit

340. The insulation unit 340 may be formed of an insulating material. The insulation unit 340 may be coupled to the ground housing 330 such that the RF contacts 310 are located in the inner side space 330*a*.

Referring to FIGS. 9 and 17 to 20, the board connector 300 according to the second embodiment may include a first ground contact 350.

The first ground contact 350 is coupled to the insulation unit 340. The first ground contact 350 may be grounded by being mounted on the second board. The first ground contact 350 may be coupled to the insulation unit 340 through an assembly process. The first ground contact 350 may also be integrally molded with the insulation unit 340 through injection molding.

The first ground contact 350 may realize a shielding function for the first RF contact 311 together with the ground housing 330. In this case, the first ground contact 350 may be disposed between the first RF contact 311 and the transmit contacts 320 with respect to the first axial direction (X-axis direction). The first ground contact 350 may be formed of an electrically conductive material. For example, the first ground contact 350 may be formed of metal. When the mating connector is inserted into the inner side space 330*a*, the first ground contact 350 may be connected to a ground contact included in the mating connector.

Although not illustrated in the drawings, the board connector 300 according to the second embodiment may also include a plurality of first ground contacts 350. The first ground contacts 350 may be disposed to be spaced apart from each other along the second axial direction (Y-axis direction). A gap, which is formed as the first ground contacts 350 are spaced apart from each other, may be blocked as the first ground contact 350 is connected to the ground contact included in the mating connector.

Referring to FIGS. 9 and 17 to 20, the board connector 300 according to the second embodiment may include a second ground contact 360.

The second ground contact 360 is coupled to the insulation unit 340. The second ground contact 360 may be grounded by being mounted on the second board. The second ground contact 360 may be coupled to the insulation unit 340 through an assembly process. The second ground contact 360 may also be integrally molded with the insulation unit 340 through injection molding.

The second ground contact 360 may realize a shielding function for the second RF contact 312 together with the ground housing 330. The second ground contact 360 may be disposed between the transmit contacts 320 and the second RF contact 312 with respect to the first axial direction (X-axis direction). The second ground contact 360 may be formed of an electrically conductive material. For example, the second ground contact 360 may be formed of metal. When the mating connector is inserted into the inner side space 330*a*, the second ground contact 360 may be connected to the ground contact included in the mating connector.

Although not illustrated in the drawings, the board connector 300 according to the second embodiment may also include a plurality of second ground contact 360. The second ground contacts 360 may be disposed to be spaced apart from each other along the second axial direction (Y-axis direction). A gap, which is formed as the second ground contacts 360 are spaced apart from each other, may be blocked as the second ground contact 360 is connected to the ground contact included in the mating connector.

Here, the board connector 300 according to the second embodiment may be realized to include a plurality of first RF contacts 311 and a plurality of second RF contacts 312.

Referring to FIGS. 9 and 17 to 21, the first RF contacts 311 and the second RF contacts 312 may be disposed to be spaced apart from each other along the first axial direction (X-axis direction). The transmit contacts 320 may be disposed between the first RF contacts 311 and the second RF contacts 312 with respect to the first axial direction (X-axis direction). In this case, the first ground contact 350 may shield between the first RF contacts 311 and the transmit contacts 320 with respect to the first axial direction (X-axis direction). The second ground contact 360 may shield between the second RF contacts 312 and the transmit contacts 320 with respect to the first axial direction (X-axis direction).

When the plurality of first RF contacts 311 are provided, the first ground contact 350 may shield between the first RF contacts 311 and the transmit contacts 320 with respect to the first axial direction (X-axis direction). As the first ground contact 350 is connected to the ground contact included in the mating connector, between the first RF contacts 311 with respect to the second axial direction (Y-axis direction) may be shielded. Accordingly, by using the first ground contact 350, the board connector 300 according to the second embodiment may realize a shielding function for between the first RF contacts 311 and the transmit contacts 320, and also, additionally realize a shielding function for between the first RF contacts 311 using the connection between the first ground contact 350 and the ground contact included in the mating connector. In this case, the board connector 300 according to the second embodiment may shield between the first RF contacts 311 using the ground housing 330. Accordingly, the board connector 300 according to the second embodiment may be realized to transmit a wider variety of RF signals using the first RF contacts 311, thereby improving versatility applicable to a wider variety of electronic products.

Figure 21:
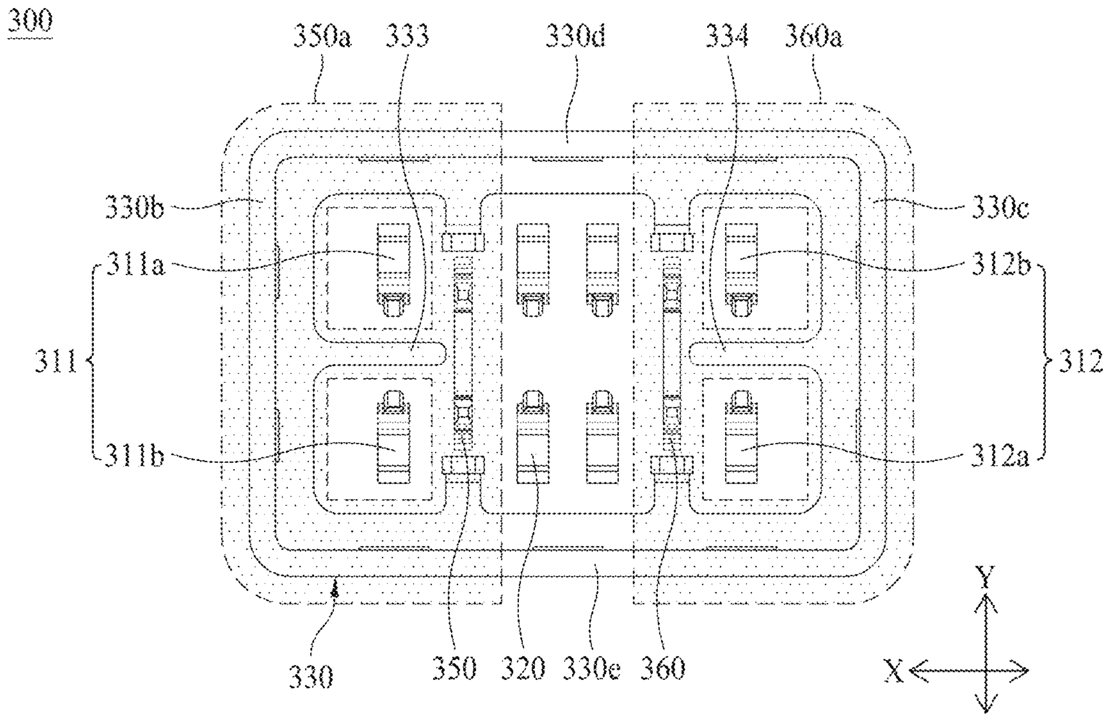
FIG. 21 is a schematic plan view for describing a ground loop in the board connector according to the second embodiment.

A first-first RF contact 311*a* among the first RF contacts 311 and a first-second RF contact 311*b* among the first RF contacts 311 may be coupled to the insulation unit 340 so as to be spaced apart from each other along the second axial direction (Y-axis direction). In FIG. 21, the board connector 300 according to the second embodiment is illustrated as including two first RF contacts 311 realized as the first-first RF contact 311*a* and the first-second RF contact 311*b*, but the present disclosure is not limited thereto, and the board connector 300 according to the second embodiment may also include three or more first RF contacts 311. Meanwhile, in the present specification, descriptions will be made on the basis of the case in which the board connector 300 according to the second embodiment includes the first-first RF contact 311*a* and the first-second RF contact 311*b*.

When the first-first RF contact 311*a* and the first-second RF contact 311*b* are provided, the first ground contact 350 may include a first ground mounting member 351 (illustrated in FIG. 9) and a first ground connection member 352 (illustrated in FIG. 9).

The first ground mounting member 351 is mounted on the second board. The first ground mounting member 351 may be grounded by being mounted on the second board. Accordingly, the first ground contact 350 may be grounded to the second board through the first ground mounting member 351. The first ground mounting member 351 may be disposed along the second axial direction (Y-axis direction). In this case, the first ground mounting member 351 may be disposed between the first-first RF contact 311*a* and the transmit contacts 320 with respect to the first axial direction (X-axis direction). The first ground mounting member 351 may also be disposed between the first-second RF contact 311*b* and the transmit contacts 320 with respect to the first axial direction (X-axis direction). The first ground mounting member 351 may be formed in a plate shape disposed in the vertical direction. The first ground mounting member 351 may be connected to the ground contact included in the mating connector. For example, as shown in FIG. 8, the first ground mounting member 351 may be connected to the first-first ground connection member 2513 included in the mating connector.

The first ground connection member 352 is coupled to the first ground mounting member 351. The first ground connection member 352 may protrude from the first ground mounting member 351 along the vertical direction. The first ground connection member 352 may be connected to the ground contact included in the mating connector. Accordingly, the first ground contact 350 may be electrically connected to the ground contact included in the mating connector by being connected to the ground contact included in the mating connector through the first ground connection member 352. Accordingly, the first ground contact 350 may realize a shielding force for the first-first RF contact 311*a* and the first-second RF contact 311*b* through the connection between the first ground connection member 352 and the ground contact included in the mating connector. In this case, the first ground contact 350 may realize a shielding force that shields between each of the first-first RF contact 311*a* and the first-second RF contact 311*b* and the transmit contacts 320 with respect to the first axial direction (X-axis direction). In this case, the first ground contact 350 may realize a shielding force that shields between the first-first RF contact 311*a* and the first-second RF contact 311*b* with respect to the second axial direction (Y-axis direction). The first ground connection member 352 may be formed in a plate shape disposed in the vertical direction.

The first ground contact 350 may include a plurality of first ground connection members 352. First ground connection members 352 and 352' (illustrated in FIG. 9) may be disposed to be spaced apart from each other along the second axial direction (Y-axis direction). The first ground connection members 352 may be connected to different ground contacts included in the mating connectors, respectively. For example, as shown in FIG. 9, the first ground connection members 352 and 352' may be respectively connected to the first-first ground contact 251 and the first-second ground contact 252 included in the mating connector. In this case, the first ground connection member 352 may be connected to the first-first ground connection member 2513 included in the first-first ground contact 251. The first ground connection member 352' may be connected to the first-second ground connection member 2521 included in the first-second ground contact 252. When the mating connector is inserted into the inner side space 330*a*, the first-first shield member 2511 of the first-first ground contact 251 included in the mating connector may be located between the first-first RF contact 311*a* and the first-second RF contact 311*b* with respect to the second axial direction (Y-axis direction).

As described above, the board connector 300 according to the second embodiment may realize a first ground loop 350*a* (illustrated in FIG. 21) for the first-first RF contact 311*a* and the first-second RF contact 311*b* using the connection between the first ground contact 350 and the ground contact included in the mating connector. Accordingly, the board connector 300 according to the second embodiment may further enhance the shielding performance for the first-first RF contact 311*a* and the first-second RF contact 311*b* using the first ground loop 350*a*, thereby realizing complete shielding for the first-first RF contact 311*a* and the first-second RF contact 311*b*.

When the plurality of second RF contacts 312 are provided, the second ground contact 360 may shield between the second RF contacts 312 and the transmit contacts 320 with respect to the first axial direction (X-axis direction). As the second ground contact 360 is connected to the ground contact included in the mating connector, shielding may be provided between the second RF contacts 312 with respect to the second axial direction (Y-axis direction). Accordingly, by using the second ground contact 360, the board connector 300 according to the second embodiment may realize a shielding function for between the second RF contacts 312 and the transmit contacts 320, and also, additionally realize a shielding function for between the second RF contacts 312 using the connection between the second ground contact 360 and the ground contact included in the mating connector. In this case, the board connector 300 according to the second embodiment may shield between the second RF contacts 312 using the ground housing 330. Accordingly, the board connector 300 according to the second embodiment may be realized to transmit a wider variety of RF signals using the second RF contacts 312, thereby improving versatility applicable to a wider variety of electronic products.

A second-first RF contact 312*a* among the second RF contacts 312 and a second-second RF contact 312*b* among the second RF contacts 312 may be coupled to the insulation unit 340 so as to be spaced apart from each other along the second axial direction (Y-axis direction). In FIG. 21, the board connector 300 according to the second embodiment is illustrated as including two second RF contacts 312 realized as the second-first RF contact 312*a* and the second-second RF contact 312*b*, but the present disclosure is not limited thereto, and the board connector 300 according to the second embodiment may also include three or more second RF contacts 312. Meanwhile, in the present specification, descriptions will be made on the basis of the case in which the board connector 300 according to the second embodiment includes the second-first RF contact 312*a* and the second-second RF contact 312*b*.

Figure 20:
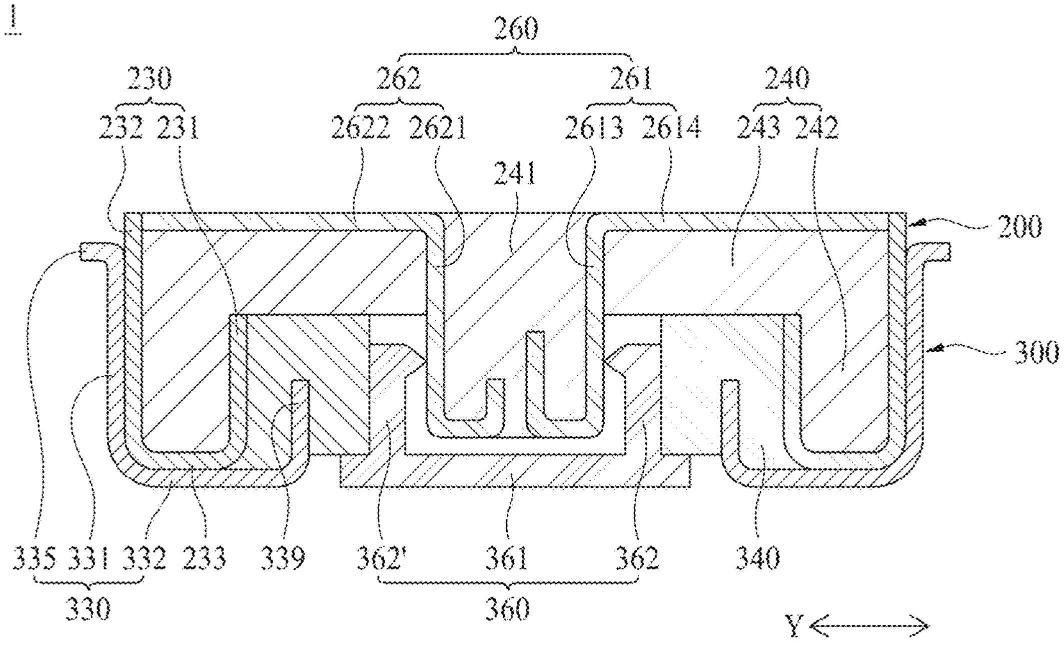
FIG. 20 is a schematic cross-sectional side view taken along line of FIG. 19, illustrating the state in which the board connector according to the second embodiment is coupled to the board connector according to the first embodiment.

When the second-first RF contact 312*a* and the second-second RF contact 312*b* are provided, the second ground contact 360 may include a second ground mounting member 361 (illustrated in FIG. 20) and a second ground connection member 362 (illustrated in FIG. 20).

The second ground mounting member 361 is mounted on the second board. The second ground mounting member 361 may be grounded by being mounted on the second board. Accordingly, the second ground contact 360 may be grounded to the second board through the second ground mounting member 361. The second ground mounting member 361 may be disposed along the second axial direction (Y-axis direction). In this case, the second ground mounting member 361 may be disposed between the second-first RF contact 312*a* and the transmit contacts 320 with respect to the first axial direction (X-axis direction). The second ground mounting member 361 may also be disposed between the second-second RF contact 312*b* and the transmit contacts 320 with respect to the first axial direction (X-axis direction). The second ground mounting member 361 may be formed in a plate shape disposed in the vertical direction. The second ground mounting member 361 may be connected to the ground contact included in the mating connector. For example, as shown in FIG. 8, the second ground mounting member 361 may be connected to the second-first ground connection member 2613 included in the mating connector.

The second ground connection member 362 is coupled to the second ground mounting member 361. The second ground connection member 362 may protrude from the second ground mounting member 361 along the vertical direction. The second ground connection member 362 may be connected to the ground contact included in the mating connector. Accordingly, the second ground contact 360 may be electrically connected to the ground contact included in the mating connector by being connected to the ground contact included in the mating connector through the second ground connection member 362. Accordingly, the second ground contact 360 may realize a shielding force for the second-first RF contact 312*a* and the second-second RF contact 312*b* through the connection between the second ground connection member 362 and the ground contact included in the mating connector. In this case, the second ground contact 360 may realize a shielding force that shields between each of the second-first RF contact 312*a* and the second-second RF contact 312*b* and the transmit contacts 320 with respect to the first axial direction (X-axis direction). In this case, the second ground contact 360 may realize a shielding force that shields between the second-first RF contact 312*a* and the second-second RF contact 312*b* with respect to the second axial direction (Y-axis direction). The second ground connection member 362 may be formed in a plate shape disposed in the vertical direction.

The second ground contact 360 may include a plurality of second ground connection members 362. Second ground connection members 362 and 362' (illustrated in FIG. 20) may be disposed to be spaced apart from each other along the second axial direction (Y-axis direction). The second ground connection members 362 may be connected to different ground contacts included in the mating connectors, respectively. For example, as shown in FIG. 20, the second ground connection members 362 and 362' may be respectively connected to the second-first ground contact 261 and the second-second ground contact 262 included in the mating connector. In this case, the second ground connection member 362 may be connected to the second-first ground connection member 2613 included in the second-first ground contact 261. The second ground connection member 362' may be connected to the second-second ground connection member 2621 included in the second-second ground contact 262. When the mating connector is inserted into the inner side space 330*a*, the second-first shield member 2611 of the second-first ground contact 261 included in the mating connector may be located between the second-first RF contact 312*a* and the second-second RF contact 312*b* with respect to the second axial direction (Y-axis direction).

As described above, the board connector 300 according to the second embodiment may realize a second ground loop 360*a* (illustrated in FIG. 21) for the second-first RF contact 312*a* and the second-second RF contact 312*b* using the connection between the second ground contact 360 and the ground contact included in the mating connector. Accordingly, the board connector 300 according to the second embodiment may further enhance the shielding performance for the second-first RF contact 312*a* and the second-second RF contact 312*b* using the second ground loop 360*a*, thereby realizing complete shielding for the second-first RF contact 312*a* and the second-second RF contact 312*b*.

Referring to FIGS. 8, 9, and 11 to 23, in the board connector 300 according to the second embodiment, the ground housing 330 may be realized as follows.

The ground housing 330 may include a ground sidewall 331 and a ground bottom 332.

The ground sidewall 331 is disposed to surround a side of the inner side space 330*a*. The ground sidewall 331 may be disposed to surround all sides of the inner side space 330*a*. When the mating connector is inserted into the inner side space 330*a*, the ground sidewall 331 may be connected to the ground housing included in the mating connector. For example, the ground sidewall 331 may be connected to the ground outer wall 232 of the ground housing 230 included in the mating connector. The ground sidewall 331 may be formed in a plate shape disposed in the vertical direction.

The ground bottom 332 protrudes from a lower end of the ground sidewall 331 toward the inner side space 330*a*. That is, the ground bottom 332 may protrude to the inside of the ground sidewall 331. The ground bottom 332 may extend along the lower end of the ground sidewall 331 and formed in a closed loop shape. The ground bottom 332 may be grounded by being mounted on the second board. Accordingly, the ground sidewall 331 may be grounded through the ground bottom 332. In this case, the ground housing 330 may be grounded through the ground bottom 332. When the mating connector is inserted into the inner side space 330*a*, the ground bottom 332 may be connected to the ground housing included in the mating connector. For example, the ground bottom 332 may be connected to the ground connection wall 233 of the ground housing 230 included in the mating connector. The ground bottom 332 may be formed in a plate shape disposed in the horizontal direction.

The ground bottom 332 and the ground sidewall 331 may be disposed to surround the inner side space 330*a*. In this case, the first RF contact 311 and the second RF contact 312 may be located in the inner side space 330*a* surrounded by the ground bottom 332 and the ground sidewall 331. Accordingly, the ground bottom 332 and the ground sidewall 331 may enhance the shielding function for the first RF contact 311 and the second RF contact 312 by realizing shielding walls for all of the first RF contact 311 and the second RF contact 312, thereby realizing complete shielding.

The ground bottom 332 and the ground sidewall 331 may be integrally formed. In this case, the ground housing 330 may be integrally formed as one piece without a seam. The ground housing 330 may be integrally formed as one piece without a seam by a metal injection method, such as a metal die casting method, an MIM method, or the like. The ground housing 330 may be integrally formed as one piece without a seam by a CNC process, an MCT process, or the like.

The ground housing 330 may include a first shield bottom 333.

The first shield bottom 333 protrudes from the ground bottom 332. The first shield bottom 333 protrudes from the ground bottom 332 toward the first ground contact 350, and thus may be located between the first-first RF contact 311*a* and the first-second RF contact 311*b* with respect to the second axial direction (Y-axis direction). Accordingly, the first shield bottom 333 may shield between the first-first RF contact 311*a* and the first-second RF contact 311*b* with respect to the second axial direction (Y-axis direction). The first shield bottom 333 may be formed in a plate shape disposed in the vertical direction.

The first shield bottom 333 may be connected to the ground contact included in the mating connector. For example, as shown in FIG. 8, the first shield bottom 333 may be connected to the first-first ground contact 251 included in the mating connector. In this case, the first shield bottom 333 may be connected to the first-first connection protrusion 2516 included in the first ground contact 250. Accordingly, the board connector 300 according to the second embodiment may realize the first ground loop 350*a* for the first-first RF contact 311*a* and the first-second RF contact 311*b* using the connection between the first shield bottom 333 and the ground contact included in the mating connector. The first shield bottom 333 and the ground bottom 332 may be integrally formed.

The ground housing 330 may include a second shield bottom 334.

The second shield bottom 334 protrudes from the ground bottom 332. The second shield bottom 334 protrudes from the ground bottom 332 toward the second ground contact 360, and thus may be located between the second-first RF contact 312*a* and the second-second RF contact 312*b* with respect to the second axial direction (Y-axis direction). Accordingly, the second shield bottom 334 may shield between the second-first RF contact 312*a* and the second-second RF contact 312*b* with respect to the second axial direction (Y-axis direction). The second shield bottom 334 may be formed in a plate shape disposed in the vertical direction.

The second shield bottom 334 may be connected to the ground contact included in the mating connector. For example, as shown in FIG. 8, the second shield bottom 334 may be connected to the second-first ground contact 261 included in the mating connector. In this case, the second shield bottom 334 may be connected to the second-first connection protrusion 2616 included in the second-first ground contact 261. Accordingly, the board connector 300 according to the second embodiment may realize the second ground loop 360*a* for the second-first RF contact 312*a* and the second-second RF contact 312*b* using the connection between the second shield bottom 334 and the ground contact included in the mating connector. The second shield bottom 334 and the ground bottom 332 may be integrally formed.

The ground housing 330 may include a ground top wall 335.

The ground top wall 335 protrudes from an upper end of the ground sidewall 331 to a side opposite to the inner side space 330*a*. In this case, the ground top wall 335 may protrude toward the outside of the ground sidewall 331. The ground top wall 335 may extend along the upper end of the ground sidewall 331 and may be formed in a closed loop shape. The ground top wall 335 may be formed in a plate shape disposed in the horizontal direction.

The ground top wall 335, the ground bottom 332, and the ground sidewall 331 may be integrally formed. In this case, the ground housing 330 may be integrally formed as one piece without a seam. The ground housing 330 may be integrally formed as one piece without a seam by a metal injection method, such as a metal die casting method, an MIM method, or the like. The ground housing 330 may be integrally formed as one piece without a seam by a CNC process, an MCT process, or the like.

A connection portion of the ground top wall 335 and the ground sidewall 331 may be formed to be rounded as shown in FIGS. 8 and 9. Accordingly, the connection portion between the ground top wall 335 and the ground sidewall 331 may serve as a guide for the mating connector when the mating connector is inserted into the inner side space 330*a*. In this case, in the connection portion of the ground top wall 335 and the ground sidewall 331, a portion facing the inner side space 330*a* may be formed to be rounded.

The ground top wall 335, the ground sidewall 331, and the ground bottom 332 may realize shielding walls. In this case, as shown in FIGS. 19 and 21, the ground housing 330 may include a first shielding wall 330*b*, a second shielding wall 330*c*, a third shielding wall 330*d*, and a fourth shielding wall 330*e*. Each of the first shielding wall 330*b*, the second shielding wall 330*c*, the third shielding wall 330*d*, and the fourth shielding wall 330*e* may be realized by the ground sidewall 331, the ground bottom 332, and the ground top wall 335. The first shielding wall 330*b* and the second shielding wall 330*c* are disposed to face each other with respect to the first axial direction (X-axis direction). The first RF contacts 311 and the second RF contacts 312 may be located between the first shielding wall 330*b* and the second shielding wall 330*c* with respect to the first axial direction (X-axis direction). The first RF contacts 311 may be located at locations each having a shorter separation distance from the first shielding wall 330*b* than a separation distance from the second shielding wall 330*c* with respect to the first axial direction (X-axis direction). The second RF contacts 312 may be located at locations each having a shorter separation distance from the second shielding wall 330*c* than a separation distance from the first shielding wall 330*b* with respect to the first axial direction (X-axis direction). The third shielding wall 330*d* and the fourth shielding wall 330*e* are disposed to face each other with respect to the second axial direction (Y-axis direction). The first RF contacts 311 and the second RF contacts 312 may be located between the third shielding wall 330*d* and the fourth shielding wall 330*e* with respect to the second axial direction (Y-axis direction).

In this case, the first ground contact 350, the first shielding wall 330*b*, the third shielding wall 330*d*, the fourth shielding wall 330*e*, and the first shield bottom 333 may realize the first ground loop 350*a* (illustrated in FIG. 21) for the first-first RF contact 311*a* and the first-second RF contact 311*b*. Accordingly, the board connector 300 according to the second embodiment may further enhance the shielding function for the first-first RF contact 311*a* and the first-second RF contact 311*b* using the first ground loop 350*a*, thereby realizing complete shielding for the first-first RF contact 311*a* and the first-second RF contact 311*b*.

In this case, the second ground contact 360, the second shielding wall 330*c*, the third shielding wall 330*d*, the fourth shielding wall 330*e*, and the second shield bottom 334 may realize the second ground loop 360*a* (illustrated in FIG. 21) for the second-first RF contact 312*a* and the second-second RF contact 312*b*. Accordingly, the board connector 300 according to the second embodiment may further enhance the shielding function for the second-first RF contact 312*a* and the second-second RF contact 312*b* using the second ground loop 360*a*, thereby realizing complete shielding for the second-first RF contact 312*a* and the second-second RF contact 312*b*.

Referring to FIGS. 8 to 13 and 23, the ground housing 330 may include the following configuration in order to further enhance the shielding function by improving the contact between the ground sidewall 331 and the ground housing of the mating connector.

First, as shown in FIG. 11, the ground housing 330 may include the connection protrusion 336. The connection protrusion 336 may be formed on an inner surface of the ground sidewall 331. The connection protrusion 336 may protrude from the inner surface of the ground sidewall 331. The connection protrusion 336 may be inserted into the ground housing 230 included in the mating connector. In this case, the connection protrusion 336 may be inserted into the connection groove 235 included in the ground housing 230 of the mating connector. Accordingly, the board connector 300 according to the second embodiment may further enhance the shielding function for the first RF contact 311 and the second RF contact 312 by improving the contact between the ground housing 330 and the ground housing 230 included in the mating connector using the connection protrusion 336. In FIG. 11, the connection protrusion 336 is illustrated as being formed to have a shorter length than the connection groove 235 with respect to the vertical direction, but the present disclosure is not limited thereto, and the connection protrusion 336 and the connection groove 235 may be formed to have lengths substantially equal to each other. The ground housing 330 may also include a plurality of connection protrusions 336. In this case, the connection protrusions 336 may be disposed to be spaced apart from each other along the inner surface of the ground sidewall 331.

Next, as shown in FIG. 12, the ground housing 330 may include the connection groove 337. The connection groove 337 may be formed on the inner surface of the ground sidewall 331. The connection groove 337 may be realized as a groove formed to a predetermined depth in the inner surface of the ground sidewall 331. The ground housing 230 included in the mating connector may be inserted into the connection groove 337. In this case, the connection protrusion 236 included in the ground housing 230 of the mating connector may be inserted into the connection groove 337. Accordingly, the board connector 300 according to the second embodiment may further enhance the shielding function for the first RF contact 311 and the second RF contact 312 by improving the contact between the ground housing 330 and the ground housing 230 included in the mating connector using the connection groove 337. In FIG. 10, the connection groove 337 is illustrated as being formed to have a longer length than the connection protrusion 236 with respect to the vertical direction, but the present disclosure is not limited thereto, and the connection groove 337 and the connection protrusion 236 may be formed to have lengths substantially equal to each other. Meanwhile, the ground sidewall 331 may support the connection protrusion 236 that is inserted into the connection groove 337, so that the connection protrusion 236 is prevented from being separated from the connection groove 337. The ground housing 330 may also include a plurality of connection grooves 337. In this case, the connection grooves 337 may be disposed to be spaced apart from each other along the inner surface of the ground sidewall 331.

Next, as shown in FIG. 13, when the ground housing 330 includes the connection protrusion 336, the connection protrusion 336 may be supported by the connection protrusion 236 included in the ground housing 230 of the mating connector. Accordingly, the board connector 300 according to the second embodiment may further enhance the shielding function for the first RF contact 311 and the second RF contact 312 by improving the contact between the ground housing 330 and the ground housing 230 included in the mating connector using the connection protrusion 336. Meanwhile, the connection protrusion 336 may be disposed on an upper side of the connection protrusion 236 to support the connection protrusion 236.

Figure 22:
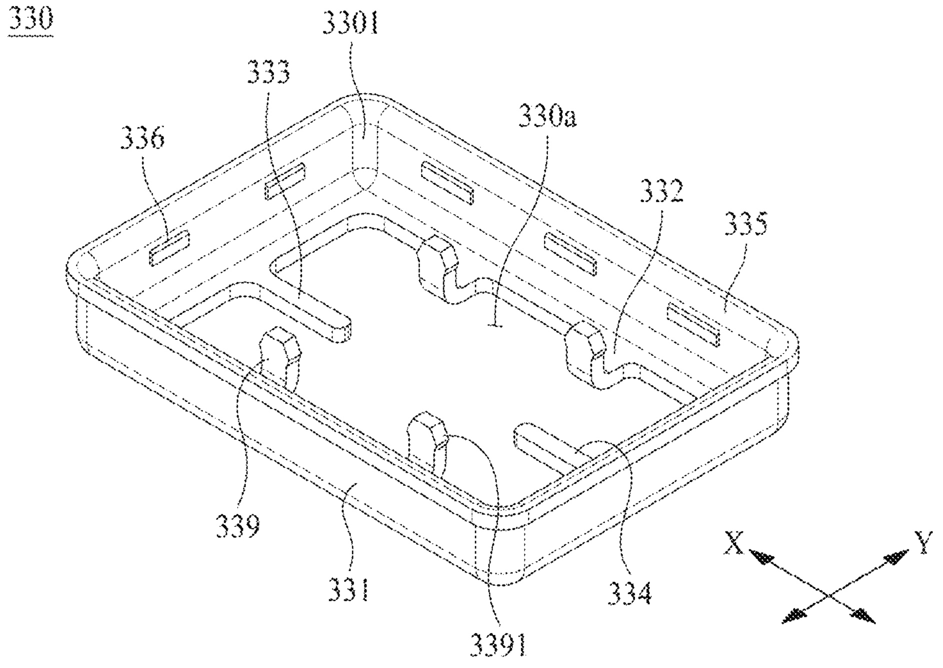
FIG. 22 is a schematic perspective view of a ground housing in the board connector according to the second embodiment.
Figure 23:
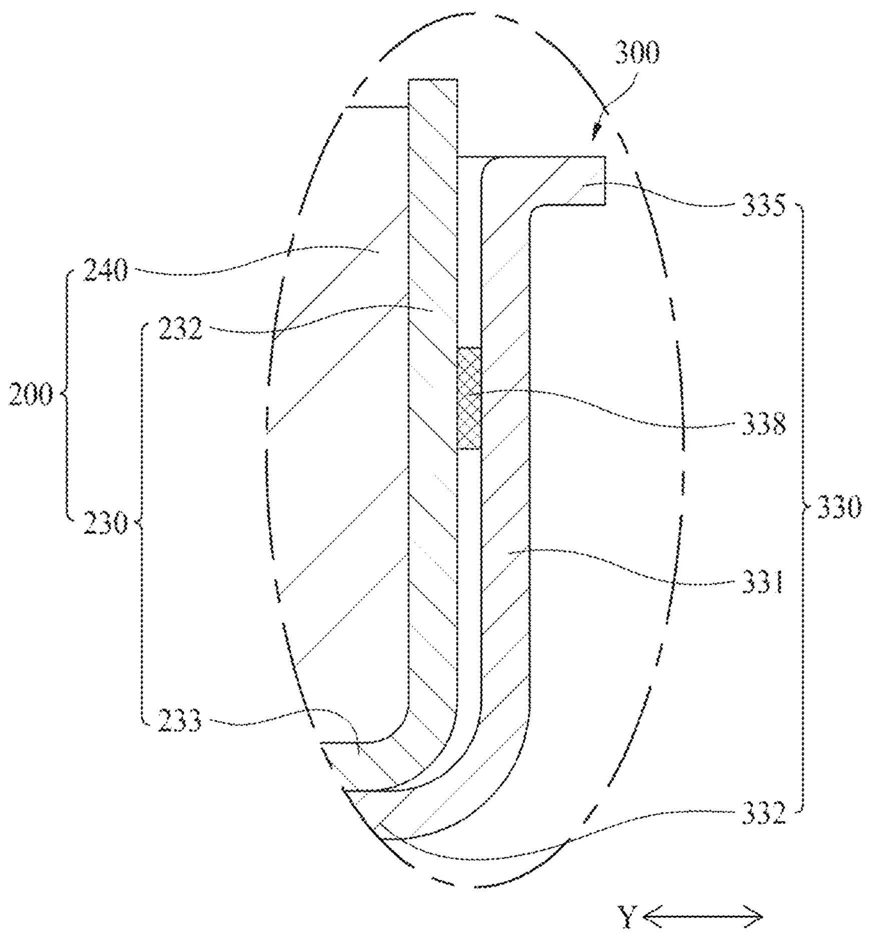
FIG. 23 is an enlarged schematic cross-sectional side view of portion A of FIG. 8, illustrating the state in which the board connector according to the second embodiment is coupled to the board connector according to the first embodiment.

Next, as shown in FIG. 8, the ground housing 330 may be in contact with the ground housing 330 of the mating connector as the inner surface of the ground sidewall 331 is brought into surface contact with the ground housing 330 of the mating connector. In this case, a gap may occur between the inner surface of the ground sidewall 331 and the ground housing 230 of the mating connector, and in order to compensate for the gap, as shown in FIG. 23, the ground housing 330 may include a conductive member 338. The conductive member 338 may be coupled to the inner surface of the ground sidewall 331. The conductive member 338 may extend along the inner surface of the ground sidewall 331, including a corner portion 3301 (illustrated in FIG. 22) included in the inner surface of the ground sidewall 331 to form a closed loop shape. Accordingly, the board connector 300 according to the second embodiment may further enhance the shielding function for the first RF contact 311 and the second RF contact 312 by improving the contact between the ground housing 330 and the ground housing 230 included in the mating connector using the conductive member 338. In addition, in the case of the embodiment using the connection protrusion 336 and the connection groove 337, it is difficult to realize the connection protrusion 336 and the connection groove 337 at the corner portion 3301 included in the inner surface of the ground sidewall 331, but in the case of the embodiment using the conductive member 338, it is possible to improve the easiness of the operation of realizing the conductive member 338 at the corner portion 3301 included in the inner surface of the ground sidewall 331. The conductive member 338 may be formed of an electrically conductive material to electrically connect the ground sidewall 331 and the ground housing 230 of the mating connector. For example, the conductive member 338 may be formed of metal. After the conductive member 338 is separately manufactured, the conductive member 338 may be coupled to the ground sidewall 331 by being mounted, attached, fastened, and the like to the inner surface of the ground sidewall 331. The conductive member 338 may also be coupled to the ground sidewall 331 by applying a conductive shielding material to the inner surface of the ground sidewall 331.

Referring to FIGS. 17 to 23, the ground housing 330 may include a coupling member 339.

The coupling member 339 protrudes upward from the ground bottom 332. When the ground housing 330 is coupled to the insulation unit 340, the coupling member 339 may be inserted into the insulation unit 340. Accordingly, the coupling member 339 may firmly couple the ground housing 330 and the insulation unit 340. The coupling member 339 may also be coupled to the insulation unit 340 in an interference fit manner. The coupling member 339 and the ground bottom 332 may be integrally formed. A coupling groove (not shown) for inserting the coupling member 339 thereto may be formed in the insulation unit 340. The coupling groove may be formed on a lower surface of the insulation unit 340.

The ground housing 330 may also include a plurality of coupling members 339. In this case, the coupling members 339 may be disposed to be spaced apart from each other along the ground bottom 332. In FIG. 22, the ground housing 330 is illustrated as including four coupling members 339, but the present disclosure is not limited thereto, and the ground housing 330 may also include two, three, or five or more coupling members 339. The coupling grooves may be formed in the insulation unit 340 in the same number as the coupling members 339.

The ground housing 330 may include a wedge member 3391 protruding from the coupling member 339. As the coupling member 339 is inserted into the insulation unit 340, the wedge member 3391 may be wedged in the insulation unit 340 to fix the ground housing 330 and the insulation unit 340. Accordingly, the board connector 300 according to the second embodiment may more firmly couple the ground housing 330 and the insulation unit 340 using the wedge member 3391. When the coupling member 339 is disposed to be spaced apart from the ground sidewall 331 along the second axial direction (Y-axis direction), the wedge member 3391 may protrude from a side surface of the coupling member 339 along the first axial direction (X-axis direction). The wedge member 3391 and the coupling member 339 may be integrally formed.

Referring to FIGS. 17 to 23, in the board connector 300 according to the second embodiment, the insulation unit 340 may include a soldering inspection window 341 (illustrated in FIG. 19).

The soldering inspection window 341 may be formed by passing through the insulation unit 340. The soldering inspection window 341 may be used to inspect a state in which the first RF mounting members 3111 are mounted on the second board. In this case, the first RF contacts 311 may be coupled to the insulation unit 340 such that the first RF mounting members 3111 are located in the soldering inspection window 341. Accordingly, the first RF mounting members 3111 are not covered by the insulation unit 340. Accordingly, in a state in which the board connector 300 according to the second embodiment is mounted on the second board, a worker may inspect the state, in which first RF mounting members 3111 are mounted on the second board, through the soldering inspection window 341. Accordingly, in the board connector 300 according to the second embodiment, even when all of the first RF contacts 311 including the first RF mounting members 3111 are located inside the ground housing 330, the accuracy of a mounting operation of mounting the first RF contacts 311 on the second board may be improved. The soldering inspection window 341 may be formed by passing through the insulating member 241.

The insulation unit 340 may also include a plurality of soldering inspection windows 341. In this case, the first RF mounting members 3111 may be located in different soldering inspection windows 341, respectively. The second RF mounting members 3121 and the transmission mounting members 3201 may be located in the soldering inspection windows 341, respectively. Accordingly, in the state in which the board connector 300 according to the second embodiment is mounted on the second board, a worker may inspect the state, in which the first RF mounting members 3111, the second RF mounting members 3121, and the transmission mounting members 3201 are mounted on the second board, through the soldering inspection windows 341. Accordingly, the board connector 300 according to the second embodiment may improve the accuracy of the operation of mounting the first RF contacts 311, the second RF contacts 312, and the transmit contacts 320 on the second board. The soldering inspection windows 341 may be formed by passing through the insulation unit 340 at locations spaced apart from each other.

Hereinafter, an embodiment of a mounting pattern of the board, on which the board connector according to the present disclosure is mounted, will be described in detail with reference to the accompanying drawings.

FIGS. 24 to 27 are conceptual bottom views illustrating an embodiment of a mounting pattern of a board on which the board connector according to the first embodiment is mounted, and FIGS. 28 to 31 are conceptual bottom views illustrating an embodiment of a mounting pattern of a board on which the board connector according to the second embodiment is mounted. FIGS. 24 to 27 illustrate a location of the mounting pattern on the basis of a bottom surface of the board connector according to the first embodiment described with reference to FIG. 5. FIGS. 28 to 31 illustrate a location of the mounting pattern on the basis of a bottom surface of the board connector according to the second embodiment described with reference to FIG. 21. In FIGS. 24 to 31, hatched regions are the locations of the mounting patterns.

Referring to FIGS. 24 to 27, the board connector 200 according to the first embodiment may be mounted on a mounting pattern 201 formed on the board (not shown). As the board connector 200 according to the first embodiment is electrically connected to the mounting pattern 201, a shielding force for the RF contacts 210 may be enhanced. The board connector 200 according to the first embodiment may be mounted on the mounting pattern 201 realized in various embodiments, and the embodiments of the mounting pattern 201 will be described sequentially with reference to the accompanying drawings.

Figure 24:
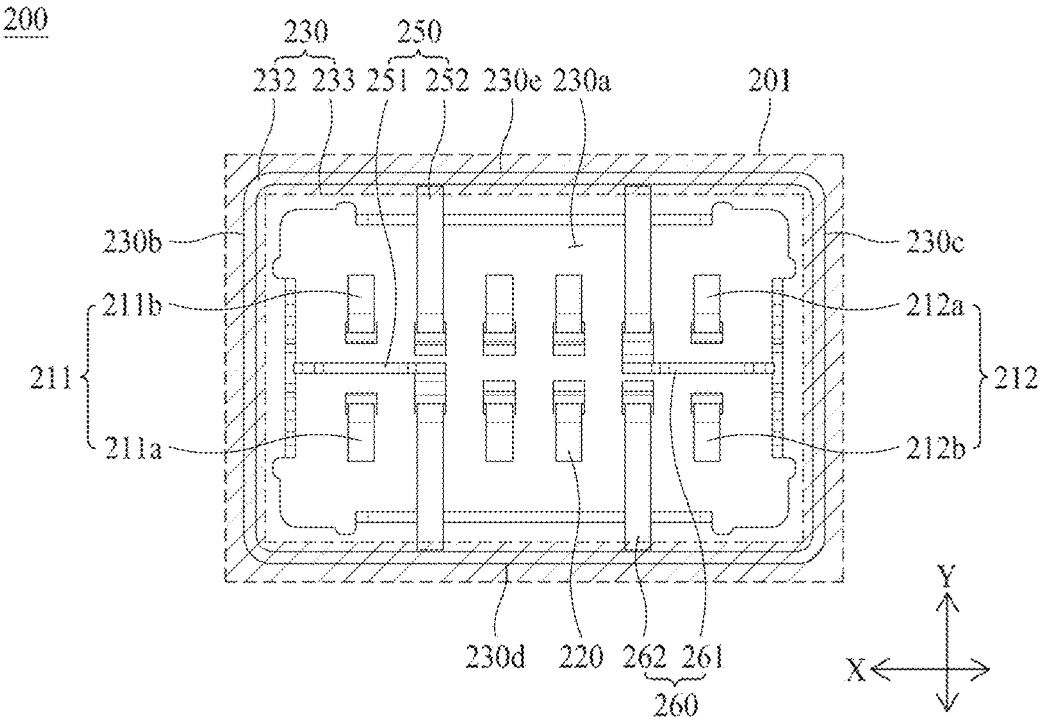
FIGS. 24 to 27 are conceptual bottom views illustrating an embodiment of a mounting pattern of a board, on which the board connector according to the first embodiment is mounted.

First, as shown in FIG. 24, the mounting pattern 201 may be formed on the board in a shape surrounding the inner side space 230*a*. For example, the mounting pattern 201 may be formed in a rectangular loop shape along an outer side of the inner side space 230*a*. The ground housing 230 may be mounted on the mounting pattern 201. When the ground housing 230 is mounted on the mounting pattern 201, the shielding force for the RF contacts 210 may be enhanced through an electrical connection between the ground housing 230 and the mounting pattern 201. In this case, the shielding force by the mounting pattern 201 may be realized in a form surrounding all of the contacts located in the inner side space 230*a*.

Figure 25:
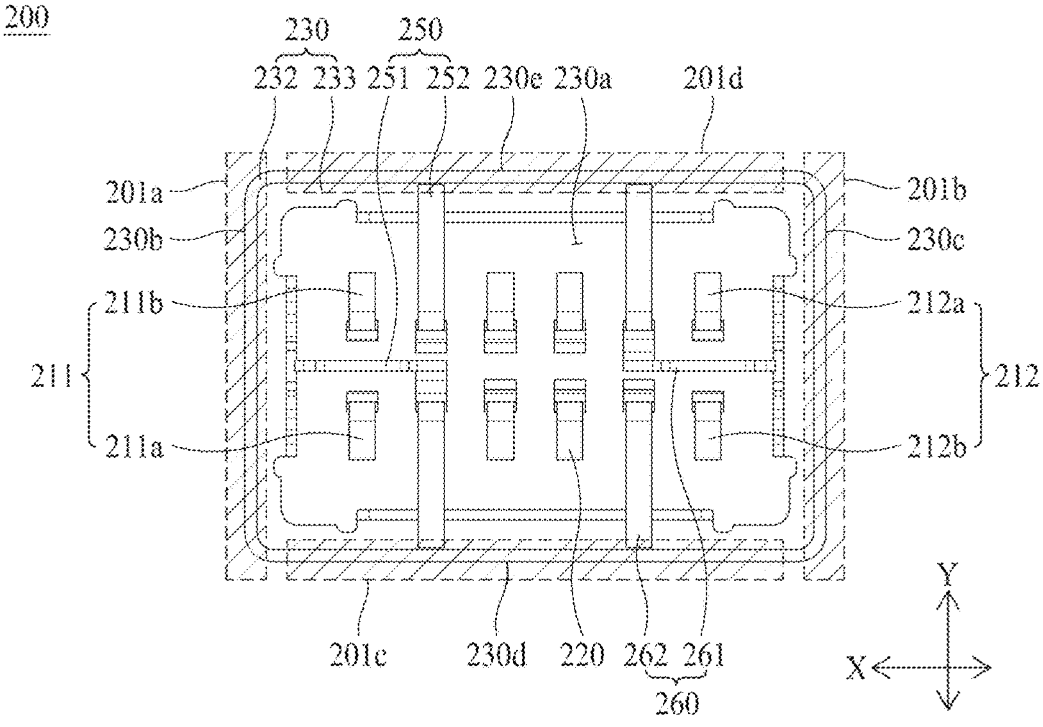

Next, as shown in FIG. 25, a first mounting pattern 201*a*, a second mounting pattern 201*b*, a third mounting pattern 201*c*, and a fourth mounting pattern 201*d* may be formed on the board. The first mounting pattern 201*a*, the second mounting pattern 201*b*, the third mounting pattern 201*c*, and the fourth mounting pattern 201*d* may be disposed to be spaced apart from each other. The ground housing 230 may be mounted on each of the first mounting pattern 201*a*, the second mounting pattern 201*b*, the third mounting pattern 201*c*, and the fourth mounting pattern 201*d*. In this case, different shielding walls 230*b*, 230*c*, 230*d*, and 230*e* included in the ground housing 230 may be mounted on the first mounting pattern 201*a*, the second mounting pattern 201*b*, the third mounting pattern 201*c*, and the fourth mounting pattern 201*d*, respectively. Accordingly, the shielding force for the RF contacts 210 may be enhanced through electrical connections between the ground housing 230 and the mounting patterns 201*a*, 201*b*, 201*c*, and 201*d*.

Figure 26:
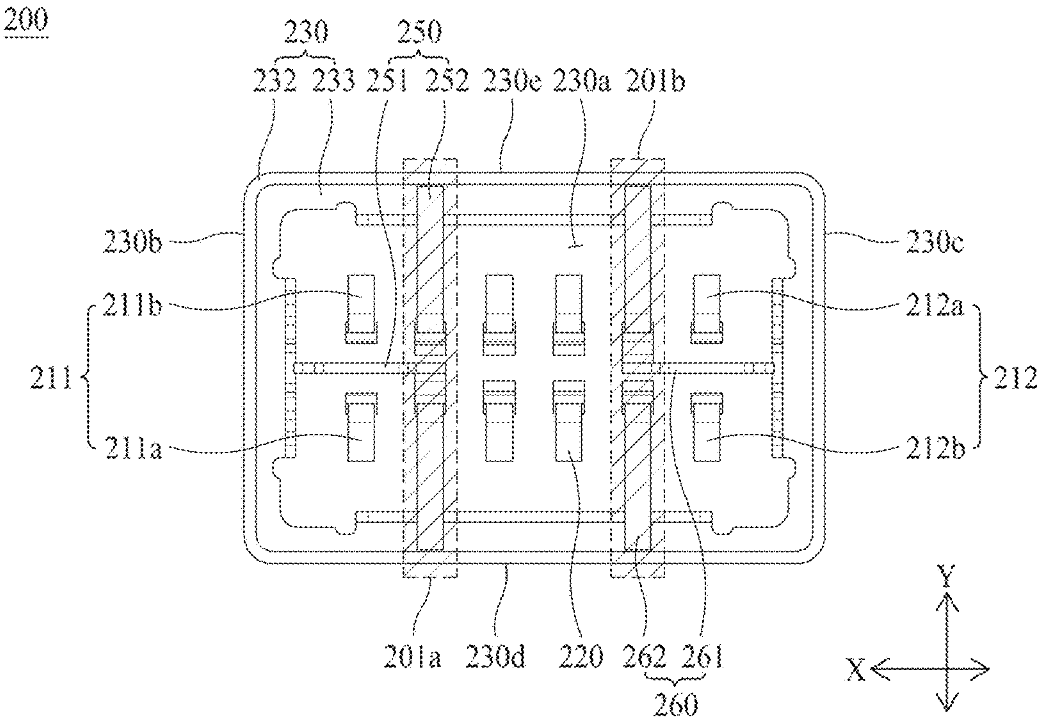

Next, as shown in FIG. 26, the first mounting pattern 201*a* and the second mounting pattern 201*b* may be formed on the board. The first mounting pattern 201*a* and the second mounting pattern 201*b* may be disposed to be spaced apart from each other along the first axial direction (X-axis direction).

The first ground contact 250 may be mounted on the first mounting pattern 201*a*. Accordingly, a shielding force for the first RF contact 211 may be enhanced through an electrical connection between the first mounting pattern 201*a* and the first ground contact 250. In this case, a portion of the first-first ground contact 251 and all of the first-second ground contact 252 may be mounted on the first mounting pattern 201*a*. The first ground contact 250 and the ground housing 230 may also be mounted on the first mounting pattern 201*a*. In this case, the third shielding wall 230*d* and the fourth shielding wall 230*e* may be mounted on the first mounting pattern 201*a*. Thus, the shielding force for the first RF contact 211 may be further enhanced. The first mounting pattern 201*a* may be formed to extend parallel to the second axial direction (Y-axis direction).

The second ground contact 260 may be mounted on the second mounting pattern 201*b*. Accordingly, a shielding force for the second RF contact 212 may be enhanced through an electrical connection between the second mounting pattern 201*b* and the second ground contact 260. In this case, a portion of the second-first ground contact 261 and all of the second-second ground contact 262 may be mounted on the second mounting pattern 201*b*. The second ground contact 260 and the ground housing 230 may also be mounted on the second mounting pattern 201*b*. In this case, the third shielding wall 230*d* and the fourth shielding wall 230*e* may be mounted on the second mounting pattern 201*b*. Thus, the shielding force for the second RF contact 212 may be further enhanced. The second mounting pattern 201*b* may be formed to extend parallel to the second axial direction (Y-axis direction).

Figure 27:
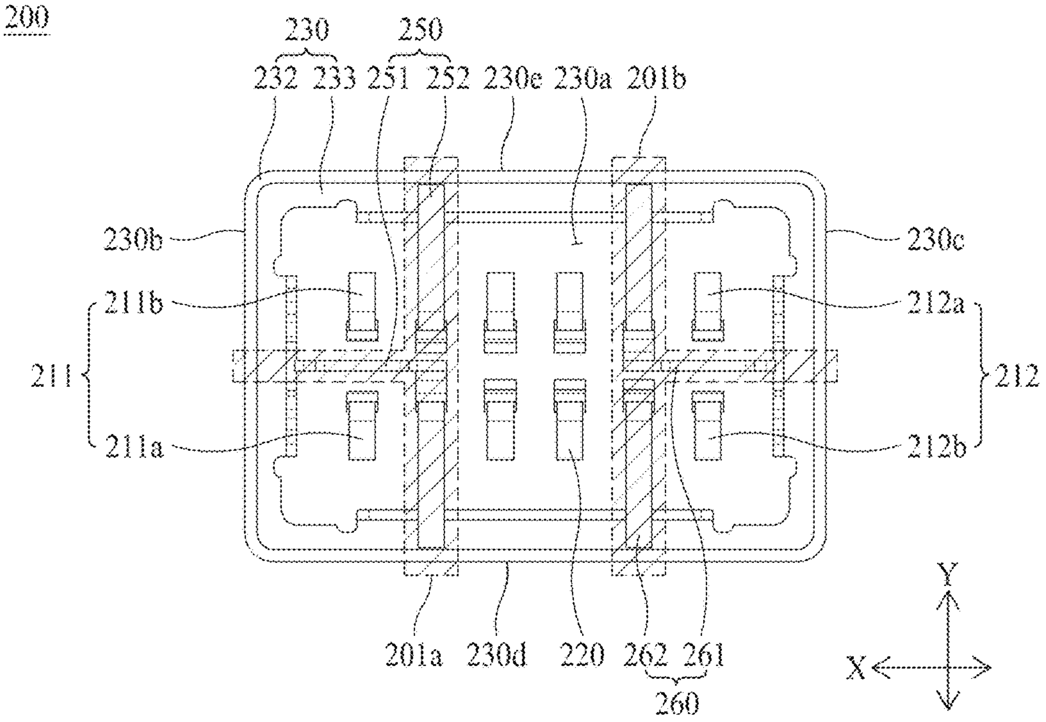

Next, as shown in FIG. 27, the first mounting pattern 201*a* and the second mounting pattern 201*b* may be formed on the board. The first mounting pattern 201*a* and the second mounting pattern 201*b* may be disposed to be spaced apart from each other along the first axial direction (X-axis direction).

The first ground contact 250 may be mounted on the first mounting pattern 201*a*. All of the first-first ground contact 251 and all of the first-second ground contact 252 may be mounted on the first mounting pattern 201*a*. Accordingly, a shielding force between the first RF contact 211 and the second RF contact 212 may be enhanced through the electrical connection between the first mounting pattern 201*a* and the first ground contact 250, and a shielding force between the first-first RF contact 211*a* and the first-second RF contact 211*b* may also be enhanced. The first ground contact 250 and the ground housing 230 may be mounted on the first mounting pattern 201*a*. In this case, the first shielding wall 230*b*, the third shielding wall 230*d*, and the fourth shielding wall 230*e* may be mounted on the first mounting pattern 201*a*. Accordingly, the shielding force between the first RF contact 211 and the second RF contact 212 and the shielding force between the first-first RF contact 211*a* and the first-second RF contact 211*b* may be further enhanced. The first mounting pattern 201*a* may be formed in a shape in which a portion extending parallel to the second axial direction (Y-axis direction) and a portion extending parallel to the first axial direction (X-axis direction) are combined. For example, the first mounting pattern 201*a* may be formed in a T-shape as a whole.

The second ground contact 260 may be mounted on the second mounting pattern 201*b*. All of the second-first ground contact 261 and all of the second-second ground contact 262 may be mounted on the second mounting pattern 201*b*. Accordingly, a shielding force between the second RF contact 212 and the first RF contact 211 may be enhanced through the electrical connection between the second mounting pattern 201*b* and the second ground contact 260, and a shielding force between the second-first RF contact 212*a* and the second-second RF contact 212*b* may also be enhanced. The second ground contact 260 and the ground housing 230 may also be mounted on the second mounting pattern 201*b*. In this case, the second shielding wall 230*c*, the third shielding wall 230*d*, and the fourth shielding wall 230*e* may be mounted on the second mounting pattern 201*b*. Accordingly, the shielding force between the first RF contact 211 and the second RF contact 212 and the shielding force between the second-first RF contact 212*a* and the second-second RF contact 212*b* may be further enhanced. The second mounting pattern 201*b* may be formed in a shape in which a portion extending parallel to the second axial direction (Y-axis direction) and a portion extending parallel to the first axial direction (X-axis direction) are combined. For example, the second mounting pattern 201*b* may be formed in a T-shape as a whole. The second mounting pattern 201*b* and the first mounting pattern 201*a* may be formed in a shape symmetrical to each other.

Referring to FIGS. 28 to 31, the board connector 300 according to the second embodiment may be mounted on a mounting pattern 301 formed on the board (not shown). As the board connector 300 according to the second embodiment is electrically connected to the mounting pattern 301, the shielding force for the RF contacts 310 may be enhanced. The board connector 300 according to the second embodiment may be mounted on the mounting pattern 301 realized in various embodiments, and the embodiments of the mounting pattern 301 will be described sequentially with reference to the accompanying drawings.

Figure 28:
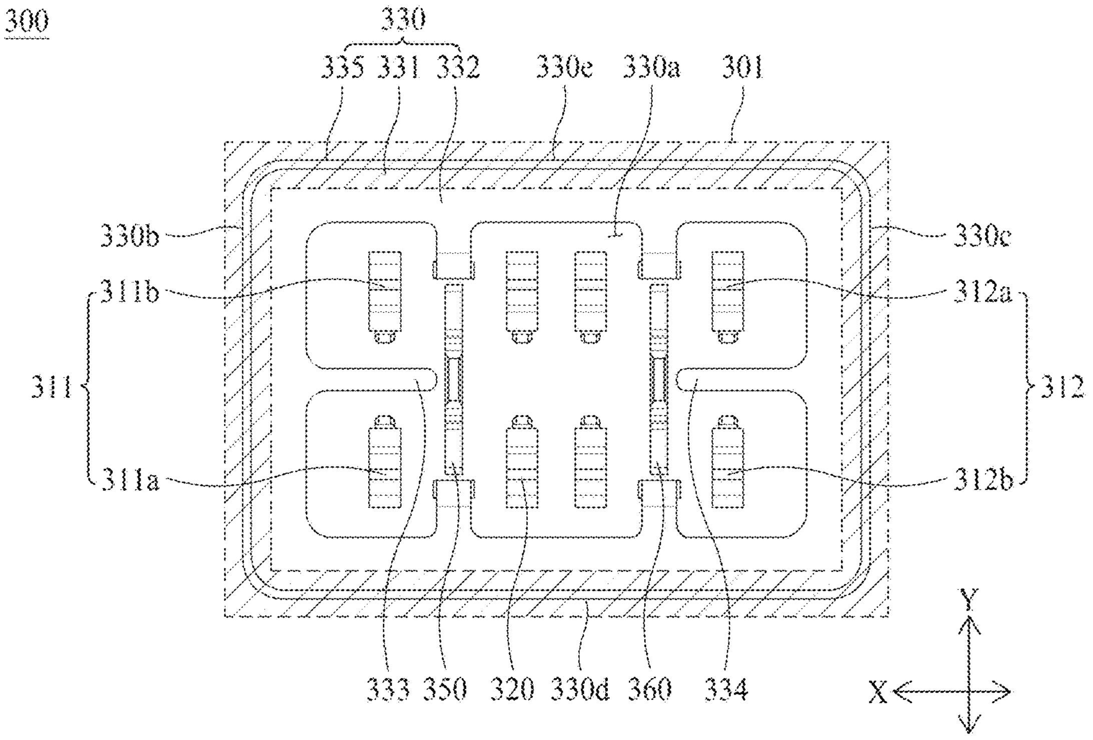
FIGS. 28 to 31 are conceptual bottom views illustrating an embodiment of a mounting pattern of a board, on which the board connector according to the second embodiment is mounted.

First, as shown in FIG. 28, the mounting pattern 301 may be formed on the board in a shape surrounding the inner side space 330*a*. For example, the mounting pattern 301 may be formed in a rectangular loop shape along an outer side of the inner side space 330*a*. The ground housing 330 may be mounted on the mounting pattern 301. When the ground housing 330 is mounted on the mounting pattern 301, a shielding force for the RF contacts 310 may be enhanced through an electrical connection between the ground housing 330 and the mounting pattern 301. In this case, the shielding force by the mounting pattern 301 may be realized in a form surrounding all of the contacts located in the inner side space 330*a*.

Figure 29:
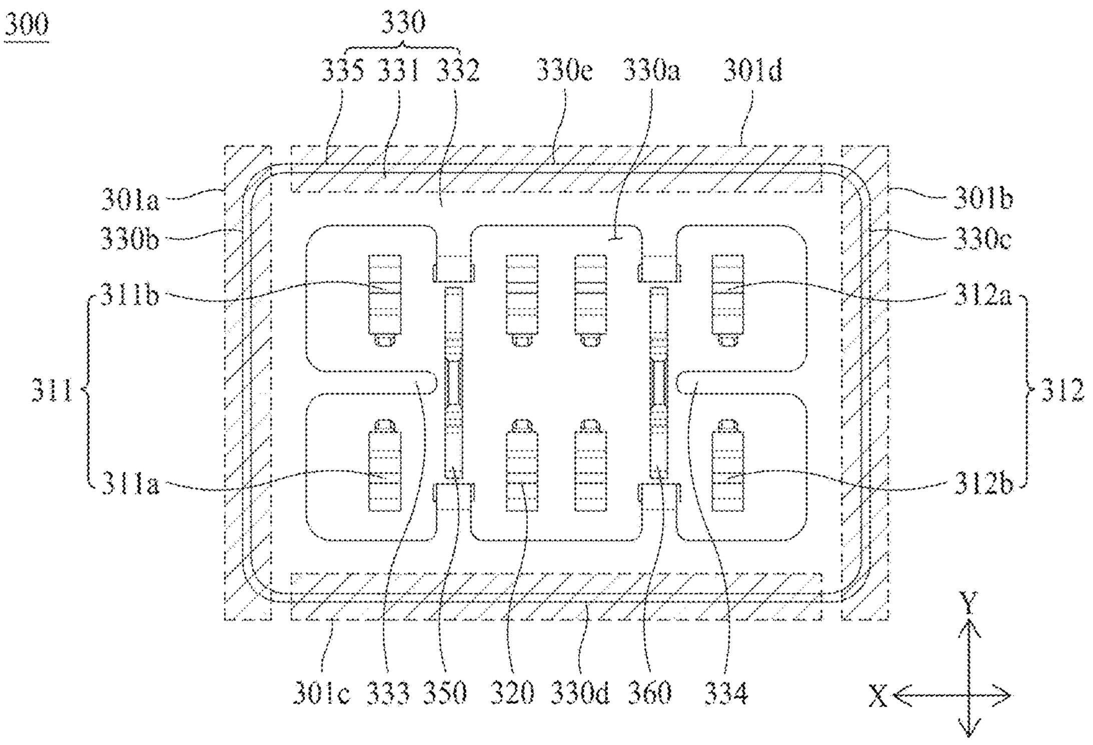

Next, as shown in FIG. 29, a first mounting pattern 301*a*, a second mounting pattern 301*b*, a third mounting pattern 301*c*, and a fourth mounting pattern 301*d* may be formed on the board. The first mounting pattern 301*a*, the second mounting pattern 301*b*, the third mounting pattern 301*c*, and the fourth mounting pattern 301*d* may be disposed to be spaced apart from each other. The ground housing 330 may be mounted on each of the first mounting pattern 301*a*, the second mounting pattern 301*b*, the third mounting pattern 301*c*, and the fourth mounting pattern 301*d*. In this case, different shielding walls 330*b*, 330*c*, 330*d*, and 330*e* included in the ground housing 330 may be mounted on the first mounting pattern 301*a*, the second mounting pattern 301*b*, the third mounting pattern 301*c*, and the fourth mounting pattern 301*d*, respectively. Accordingly, the shielding force for the RF contacts 310 may be enhanced through electrical connections between the ground housing 330 and the mounting patterns 301*a*, 301*b*, 301*c*, and 301*d*.

Figure 30:
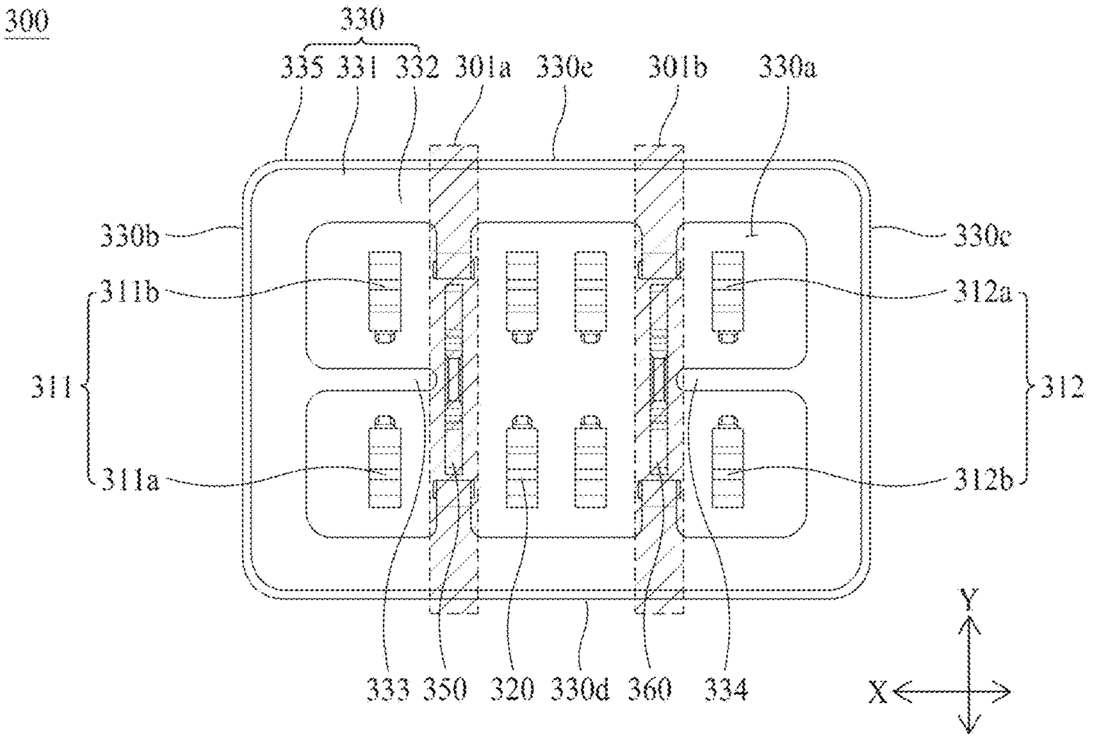

Next, as shown in FIG. 30, the first mounting pattern 301*a* and the second mounting pattern 301*b* may be formed on the board. The first mounting pattern 301*a* and the second mounting pattern 301*b* may be disposed to be spaced apart from each other along the first axial direction (X-axis direction).

The first ground contact 350 may be mounted on the first mounting pattern 301*a*. Accordingly, a shielding force for the first RF contact 311 may be enhanced through an electrical connection between the first mounting pattern 301*a* and the first ground contact 350. In this case, all of the first ground contact 350 and a portion of the first shield bottom 333 may be mounted on the first mounting pattern 301*a*. The first ground contact 350 and the ground housing 330 may also be mounted on the first mounting pattern 301*a*. In this case, the third shielding wall 330*d* and the fourth shielding wall 330*e* may be mounted on the first mounting pattern 301*a*. Thus, the shielding force for the first RF contact 311 may be further enhanced. The first mounting pattern 301*a* may be formed to extend parallel to the second axial direction (Y-axis direction).

The second ground contact 360 may be mounted on the second mounting pattern 301*b*. Accordingly, a shielding force for the second RF contact 312 may be enhanced through an electrical connection between the second mounting pattern 301*b* and the second ground contact 360. In this case, all of the second ground contact 360 and a portion of the second shield bottom 334 may be mounted on the second mounting pattern 301*b*. The second ground contact 360 and the ground housing 330 may also be mounted on the second mounting pattern 301*b*. In this case, the third shielding wall 330*d* and the fourth shielding wall 330*e* may be mounted on the second mounting pattern 301*b*. Thus, the shielding force for the second RF contact 312 may be further enhanced. The second mounting pattern 301*b* may be formed to extend parallel to the second axial direction (Y-axis direction).

Figure 31:
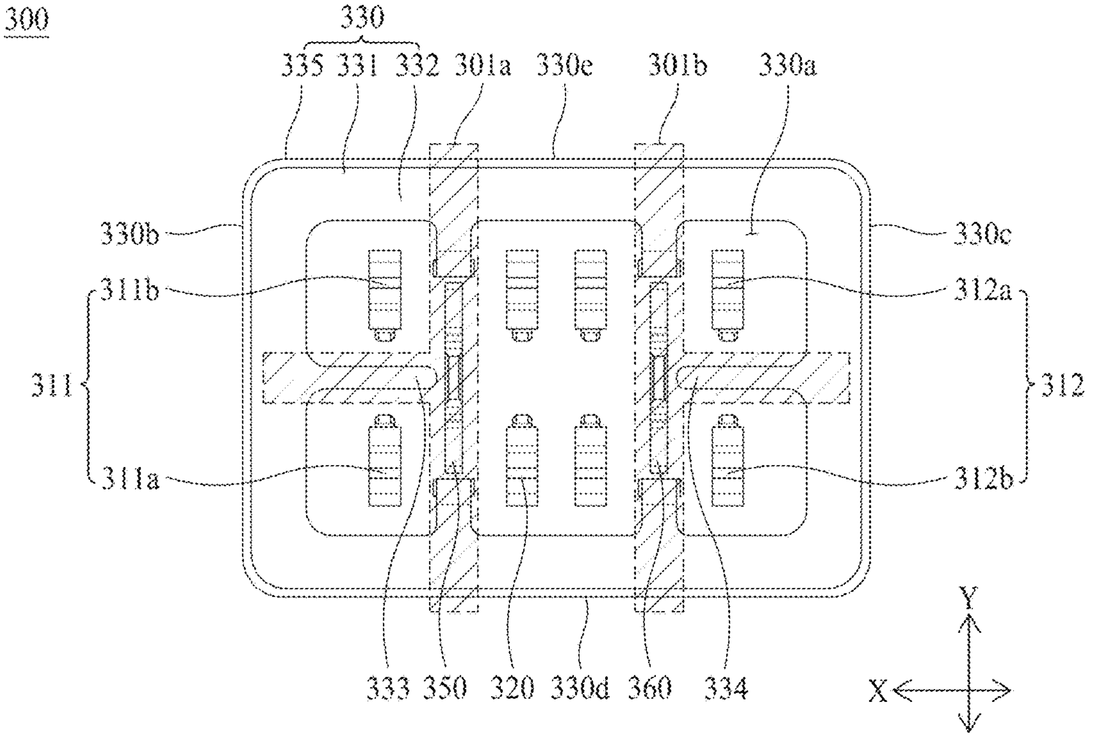

Next, as shown in FIG. 31, the first mounting pattern 301*a* and the second mounting pattern 301*b* may be formed on the board. The first mounting pattern 301*a* and the second mounting pattern 301*b* may be disposed to be spaced apart from each other along the first axial direction (X-axis direction).

The first ground contact 350 may be mounted on the first mounting pattern 301*a*. All of the first ground contact 350 and all of the first shield bottom 333 may be mounted on the first mounting pattern 301*a*. Accordingly, a shielding force between the first RF contact 311 and the second RF contact 312 may be enhanced through the electrical connection between the first mounting pattern 301*a* and the first ground contact 350, and a shielding force between the first-first RF contact 311*a* and the first-second RF contact 311*b* may be enhanced through the electrical connection between the first mounting pattern 301*a* and the first shield bottom 333. The first ground contact 350 and the ground housing 330 may also be mounted on the first mounting pattern 301*a*. In this case, the third shielding wall 330*d* and the fourth shielding wall 330*e* may be mounted on the first mounting pattern 301*a*. Thus, the shielding force between the first RF contact 311 and the second RF contact 312 and the shielding force between the first-first RF contact 311*a* and the first-second RF contact 311*b* may be further enhanced. Although not shown in the drawings, the first shielding wall 330*b*, the third shielding wall 330*d*, and the fourth shielding wall 330*e* may also be mounted on the first mounting pattern 301*a*. The first mounting pattern 301*a* may be formed in a shape in which a portion extending parallel to the second axial direction (Y-axis direction) and a portion extending parallel to the first axial direction (X-axis direction) are combined. For example, the first mounting pattern 301*a* may be formed in a T-shape as a whole.

The second ground contact 360 may be mounted on the second mounting pattern 301*b*. All of the second ground contact 360 and all of the second shield bottom 334 may be mounted on the second mounting pattern 301*b*. Accordingly, a shielding force between the second RF contact 312 and the first RF contact 311 may be enhanced through the electrical connection between the second mounting pattern 301*b* and the second ground contact 360, and a shielding force between the second-first RF contact 312*a* and the second-second RF contact 312*b* may be enhanced through an electrical connection between the second mounting pattern 301*b* and the second shield bottom 334. The second ground contact 360 and the ground housing 330 may also be mounted on the second mounting pattern 301*b*. In this case, the third shielding wall 330*d* and the fourth shielding wall 330*e* may be mounted on the second mounting pattern 301*b*. Accordingly, the shielding force between the second RF contact 312 and the first RF contact 311 and the shielding force between the second-first RF contact 312*a* and the second-second RF contact 312*b* may be further enhanced. Although not shown in the drawings, the second shielding wall 330*c*, the third shielding wall 330*d*, and the fourth shielding wall 330*e* may also be mounted on the second mounting pattern 301*b*. The second mounting pattern 301*b* may be formed in a shape in which a portion extending parallel to the second axial direction (Y-axis direction) and a portion extending parallel to the first axial direction (X-axis direction) are combined. For example, the second mounting pattern 301*b* may be formed in a T-shape as a whole. The second mounting pattern 301*b* and the first mounting pattern 301*a* may be formed in a shape symmetrical to each other.

It should be understood that the present disclosure is not limited to the above-described embodiments and the accompanying drawings, and various substitutions, modifications, and alterations can be devised by those skilled in the art to which the present disclosure pertains without departing from the technical spirit of the embodiments described herein.

The invention claimed is:

1. A board connector comprising:

a plurality of radio frequency (RF) contacts for transmitting an RF signal;

an insulation unit configured to support the RF contacts;

a plurality of transmit contacts that are coupled to the insulation unit between a plurality of first RF contacts among the RF contacts and a plurality of second RF contacts among the RF contacts such that the first RF contacts and the second RF contacts are spaced apart from each other along a first axial direction;

a ground housing to which the insulation unit is coupled;

a first ground contact coupled to the insulation unit and configured to shield between the first RF contacts and the transmit contacts with respect to the first axial direction; and a second ground contact coupled to the insulation unit and configured to shield between the second RF contacts and the transmit contacts with respect to the first axial direction, wherein the first ground contact shields between the first RF contacts and the transmit contacts with respect to the first axial direction, and shields between the first RF contacts with respect to a second axial direction perpendicular to the first axial direction.

2. The board connector of claim 1, wherein the first ground contact includes a first-first ground contact located between a first-first RF contact among the first RF contacts and the transmit contacts with respect to the first axial direction, and a first-second ground contact located between a first-second RF contact among the first RF contacts and the transmit contacts with respect to the first axial direction, wherein the first-first ground contact includes a first-first shield member located between the first-first RF contact and the first-second RF contact with respect to the second axial direction.

3. The board connector of claim 2, wherein the first-first ground contact includes a first-first shield protrusion protruding from the first-first shield member, wherein the first-first shield protrusion is connected to the ground housing.

4. The board connector of claim 3, wherein the ground housing includes a first sub-ground inner wall facing the insulation unit and a first wedge member protruding from the first sub-ground inner wall, and the first-first shield protrusion is electrically connected to the ground housing by being connected to the first wedge member.

5. The board connector of claim 2, wherein the first-first ground contact includes a first-first ground mounting member mounted on a board, and a first-first ground connection member coupled to each of the first-first ground mounting member and the first-first shield member, the first-first shield member protrudes from the first-first ground connection member along the first axial direction, and the first-first ground mounting member protrudes from the first-first ground connection member along the second axial direction.

6. The board connector of claim 2, wherein the first-first ground contact includes a first-first ground protrusion protruding from the first-first shield member, wherein the first-first ground protrusion is mounted on a board.

7. The board connector of claim 2, wherein the first-first ground contact includes a first-first connection protrusion protruding from the first-first shield member, wherein the first-first connection protrusion protrudes from the insulation unit to be connected to a ground housing of a mating connector.

8. The board connector of claim 2, wherein the second ground contact includes a second-first ground contact located between a second-first RF contact among the second RF contacts and the transmit contacts with respect to the first axial direction, and a second-second ground contact located between a second-second RF contact among the second RF contacts and the transmit contacts with respect to the first axial direction, wherein the second-first ground contact includes a second-first shield member located between the second-first RF contact and the second-second RF contact with respect to the second axial direction.

9. The board connector of claim 8, wherein the first-first ground contact and the second-first ground contact are disposed to be point-symmetric with respect to a symmetry point that is spaced apart from each of both sidewalls of the ground housing, which are disposed to be spaced apart from each other with respect to the first axial direction, by the same distance, and spaced apart from each of both sidewalls of the ground housing, which are disposed to be spaced apart from each other with respect to the second axial direction, by the same distance, and the first-second ground contact and the second-second ground contact are disposed to be point-symmetric with respect to the symmetry point.

10. The board connector of claim 2, wherein the second ground contact includes a second-first ground contact formed in the same shape as the first-first ground contact, and a second-second ground contact formed in the same shape as the first-second ground contact.

11. The board connector of claim 1, wherein the ground housing includes a ground inner wall facing the insulation unit, a ground outer wall spaced apart from the ground inner wall, and a ground connection wall coupled to each of the ground inner wall and the ground outer wall, the ground inner wall includes a first sub-ground inner wall and a second sub-ground inner wall disposed to face each other with respect to the first axial direction, and a third sub-ground inner wall and a fourth sub-ground inner wall disposed to face each other with respect to the second axial direction, the first RF contacts are located between the first sub-ground inner wall and the first ground contact with respect to the first axial direction, and located between the third sub-ground inner wall and the fourth sub-ground inner wall with respect to the second axial direction, and the second RF contacts are located between the second sub-ground inner wall and the second ground contact with respect to the first axial direction, and located between the third sub-ground inner wall and the fourth sub-ground inner wall with respect to the second axial direction.

12. The board connector of claim 1, wherein the ground housing includes a ground inner wall facing the insulation unit, a ground outer wall spaced apart from the ground inner wall, and a ground connection wall coupled to each of the ground inner wall and the ground outer wall, the ground housing includes a conductive member coupled to an outer surface of the ground outer wall, and the conductive member is formed in a closed loop shape to extend along the ground outer wall, including a corner portion included in the ground outer wall.

13. The board connector of claim 1, wherein each of the first RF contacts includes a first RF mounting member in order to be mounted on a board, wherein each of the first RF mounting members is coupled to the insulation unit such that each of the first RF mounting members is located in a soldering inspection window that is formed by passing through the insulation unit.

14. The board connector of claim 1, wherein the ground housing includes a ground inner wall facing the insulation unit, a ground outer wall spaced apart from the ground inner wall and mounted on a board, and a ground connection wall coupled to each of the ground inner wall and the ground outer wall, and the ground housing is grounded through the ground outer wall mounted on the board.

15. A board connector comprising:

a plurality of radio frequency (RF) contacts for transmitting an RF signal;

an insulation unit configured to support the RF contacts;

a plurality of transmit contacts that are coupled to the insulation unit between a plurality of first RF contacts among the RF contacts and a plurality of second RF contacts among the RF contacts such that the first RF contacts and the second RF contacts are spaced apart from each other along a first axial direction;

a ground housing to which the insulation unit is coupled;

a first ground contact coupled to the insulation unit and configured to shield between the first RF contacts and the transmit contacts with respect to the first axial direction; and a second ground contact coupled to the insulation unit and configured to shield between the second RF contacts and the transmit contacts with respect to the first axial direction, wherein the ground housing comprises a ground sidewall surrounding a side of an inner side space and a ground bottom protruding toward the inner side space from a lower end of the ground sidewall, wherein the ground sidewall and the ground bottom have a seamless continuous surface without any gaps and are integrally formed, and wherein the ground housing is disposed to surround the first RF contacts and the second RF contacts arranged in the inner side space along the first axial direction and a second axial direction perpendicular to the first axial direction, such that the first RF contacts and the second RF contacts positioned in the inner space are completely shielded by the ground housing along the first axial direction and the second axial direction and are not exposed to an outside in the first axial direction and the second axial direction.

16. The board connector of claim 15, wherein a first-first RF contact among the first RF contacts and a first-second RF contact among the first RF contacts are spaced apart from each other along a second axial direction, the first ground contact is connected to a ground contact of a mating connector and realizes a shielding force that shields between the first-first RF contact and the first-second RF contact with respect to the second axial direction, and the ground housing includes:

a first shield bottom protruding toward the first ground contact from the ground bottom so as to be located between the first-first RF contact and the first-second RF contact with respect to the second axial direction.

17. The board connector of claim 15, wherein a second-first RF contact among the second RF contacts and a second-second RF contact among the second RF contacts are spaced apart from each other along a second axial direction, the second ground contact is connected to a ground contact of a mating connector and realizes a shielding force that shields between the second-first RF contact and the second-second RF contact with respect to the second axial direction, and the ground housing includes:

a second shield bottom protruding toward the second ground contact from the ground bottom so as to be located between the second-first RF contact and the second-second RF contact with respect to the second axial direction.

18. The board connector of claim 15, wherein the ground housing includes a conductive member coupled to an inner surface of the ground sidewall, wherein the conductive member is formed in a closed loop shape to extend along the inner surface of the ground sidewall, including a corner portion included in the inner surface of the ground sidewall.

19. The board connector of claim 15, wherein each of the first RF contacts includes a first RF mounting member in order to be mounted on a board, wherein each of the first RF mounting members is coupled to the insulation unit such that each of the first RF mounting members is located in a soldering inspection window that is formed by passing through the insulation unit.

20. The board connector of claim 15, wherein the ground housing is grounded through the ground bottom mounted on the board.

* * * * *